United States Patent
Metschan et al.

(10) Patent No.: US 9,211,679 B1
(45) Date of Patent: Dec. 15, 2015

(54) SYSTEMS AND METHODS OF FORMING A SKIN FOR A COMPOSITE STRUCTURE AND COMPOSITE STRUCTURES INCLUDING THE SAME

(71) Applicant: The Boeing Company, Seal Beach, CA (US)

(72) Inventors: Stephen Lee Metschan, Black Diamond, WA (US); Richard V. Phillips, Enumclaw, WA (US); Kurtis S. Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 13/886,976

(22) Filed: May 3, 2013

(51) Int. Cl.
| | | |
|---|---|---|
| *B29C 70/30* | (2006.01) | |
| *B29C 70/02* | (2006.01) | |
| *B29C 70/56* | (2006.01) | |
| *B29C 70/34* | (2006.01) | |
| *B29C 65/00* | (2006.01) | |

(52) U.S. Cl.
CPC ......... *B29C 70/021* (2013.01); *B29C 66/81455* (2013.01); *B29C 70/30* (2013.01); *B29C 70/34* (2013.01); *B29C 70/56* (2013.01); *Y10T 156/1044* (2015.01)

(58) Field of Classification Search
None
See application file for complete search history.

(56) References Cited

U.S. PATENT DOCUMENTS

| | | | |
|---|---|---|---|
| 2,679,278 | A | 5/1954 | Clark |
| 7,228,611 | B2 | 6/2007 | Anderson et al. |
| 7,527,222 | B2 | 5/2009 | Biornstad et al. |
| 7,624,488 | B2 | 12/2009 | Lum et al. |
| 7,879,177 | B2 | 2/2011 | McCowin et al. |
| 8,157,212 | B2 | 4/2012 | Biornstad et al. |
| 8,168,023 | B2 | 5/2012 | Chapman et al. |
| 8,182,628 | B2 | 5/2012 | Biornstad et al. |
| 2010/0011580 | A1 | 1/2010 | Brennan et al. |
| 2010/0012260 | A1* | 1/2010 | Brennan et al. ............... 156/196 |
| 2012/0312459 | A1* | 12/2012 | De Mattia ...................... 156/212 |
| 2014/0265058 | A1* | 9/2014 | Gautier et al. ................. 264/553 |

OTHER PUBLICATIONS

U.S. Appl. No. 13/626,452, filed Sep. 25, 2012, Robins et al.
U.S. Appl. No. 13/693,887, filed Dec. 4, 2012, Rotter et al.
U.S. Appl. No. 13/732,961, filed Jan. 2, 2013, Rotter et al.
U.S. Appl. No. 13/769,022, filed Feb. 15, 2013, Robins et al.

* cited by examiner

*Primary Examiner* — Barbara J Musser
(74) *Attorney, Agent, or Firm* — DASCENZO Intellectual Property Law, P.C.

(57) ABSTRACT

Systems and methods of forming a skin for a composite structure and composite structures including the same. The systems and methods include operatively attaching a charge of composite material to a flexible substrate to define a composite-substrate assembly. The systems and methods further include deforming the composite-substrate assembly by conforming the composite-substrate assembly to a non-planar pre-forming surface of a pre-forming mandrel to define a non-planar skin surface contour on the charge of composite material. The systems and methods further include maintaining the charge of composite material in tension in a direction that is parallel to an interface between the charge of composite material and the flexible substrate during the deforming.

21 Claims, 10 Drawing Sheets

SYSTEMS AND METHODS OF FORMING A SKIN FOR A COMPOSITE STRUCTURE AND COMPOSITE STRUCTURES INCLUDING THE SAME

FIELD

The present disclosure is directed generally to systems and methods for forming a skin for a composite structure, to composite structures including the skin, and/or to systems and methods that utilize a flexible substrate to maintain a charge of composite material in tension during formation of the skin.

BACKGROUND

Historically, construction and/or assembly of a composite structure on a layup mandrel is a serial process that involves sequentially forming a plurality of support structures, such as stringers and/or spacers, on a surface of the layup mandrel, followed by locating a continuous, or at least substantially continuous, length of composite fibers around the surface of the layup mandrel to form a skin of the composite structure. This locating may be accomplished by wrapping the length of composite fibers around the surface of the layup mandrel, such as by rotating the layup mandrel with respect to a layup head that dispenses the length of composite fibers and/or by moving the layup head relative to the layup mandrel.

Generally, the support structures are formed from a plurality of plies, or layers, of a composite material, such as a pre-preg (or pre-impregnated) material, and each layer of the plurality of layers may be applied individually and/or sequentially to the surface of the layup mandrel. Similarly, the skin typically includes a plurality of layers, with each layer of the plurality of layers being applied individually and/or sequentially to the surface of the layup mandrel.

As composite structures become larger and more complex, such as may be the case for composite barrel assemblies for an airplane fuselage, the time required to perform the above-described serial processes becomes significant. In addition, a cost of layup mandrels for large and/or complex composite structures is substantial. Thus, there exists a need for improved systems and methods for assembling a skin of a composite structure.

SUMMARY

Systems and methods of forming a skin for a composite structure and composite structures including the same. The systems and methods include operatively attaching a charge of composite material to a flexible substrate to define a composite-substrate assembly. The systems and methods further include deforming the composite-substrate assembly by conforming the composite-substrate assembly to a non-planar pre-forming surface of a pre-forming mandrel to define a non-planar skin surface contour on the charge of composite material. The systems and methods further include maintaining the charge of composite material in tension in a direction that is parallel to an interface between the charge of composite material and the flexible substrate during the deforming.

In some embodiments, the flexible substrate may define an undeformed conformation during the operatively attaching and a deformed conformation subsequent to the deforming, with the deformed conformation being different from the undeformed conformation. In some embodiments, the undeformed conformation may be a planar, or at least substantially planar, conformation. In some embodiments, the deforming includes contouring a surface of the charge of composite material from an initial contour to the non-planar skin surface contour, with the initial contour being different from the non-planar skin surface contour.

In some embodiments, the deforming may include applying a deformation force to the composite-substrate assembly. In some embodiments, the systems and methods further may include regulating a rate of the deforming, a length of time during which the deforming occurs, and/or a magnitude of the deformation force. In some embodiments, the regulating includes avoiding separation of the charge of composite material from the flexible substrate during the deforming.

In some embodiments, the non-planar pre-forming surface defines a convex surface contour and the maintaining includes locating the flexible substrate between the pre-forming mandrel and the charge of composite material during the deforming. In some embodiments, the non-planar pre-forming surface defines a concave surface contour and the maintaining includes locating the charge of composite material between the flexible substrate and the pre-forming mandrel during the deforming. In some embodiments, the maintaining includes selecting the charge of composite material and/or the flexible substrate to permit the maintaining.

In some embodiments, the systems and methods further include controlling a maximum interfacial force that may be applied to the interface between the charge of composite material and the flexible substrate without relative motion therebetween. In some embodiments, the systems and methods further include heating the charge of composite material. In some embodiments, the systems and methods further include vacuum compacting the charge of composite material.

In some embodiments, the defining includes defining a deformed charge of composite material. In some embodiments, the systems and methods further include separating the deformed charge of composite material from the flexible substrate to define a non-planar skin for a composite structure. In some embodiments, the deforming includes deforming the flexible substrate to a deformed conformation and the separating includes returning the flexible substrate to an undeformed conformation that is different from the deformed conformation. In some embodiments, the systems and methods further include separating the composite-substrate assembly from the pre-forming mandrel. In some embodiments, the systems and methods further include forming a composite structure that includes the non-planar skin.

DESCRIPTION

Figure 1:
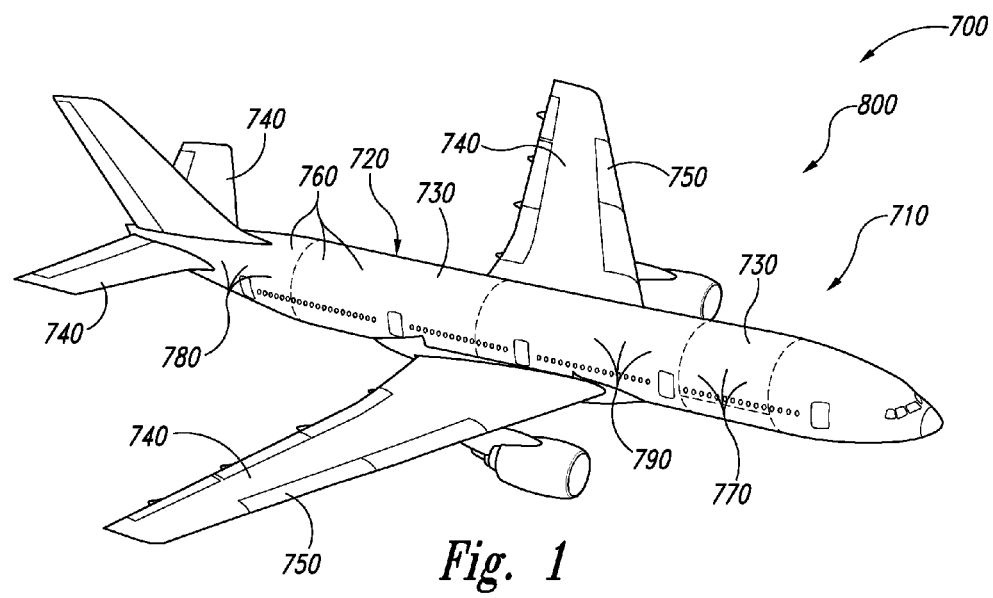
FIG. 1 is an illustrative, non-exclusive example of an aircraft that includes a composite structure that may be formed using the systems and methods according to the present disclosure.

FIGS. 1-14 provide illustrative, non-exclusive examples of composite structures 800, composite structure manufacturing apparatus 20, and/or components thereof according to the present disclosure. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
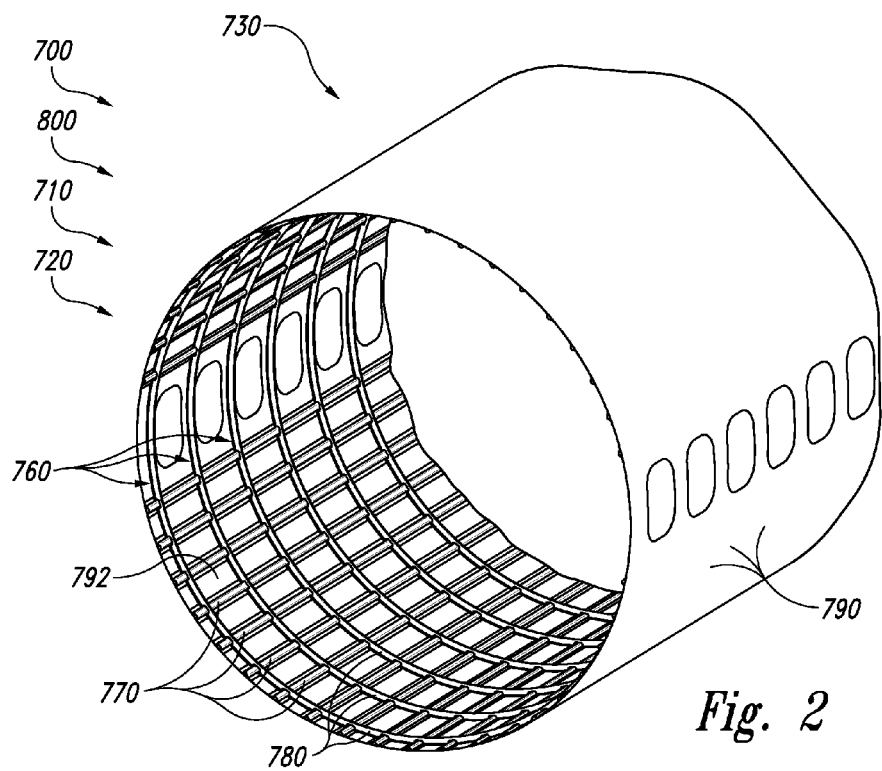
FIG. 2 is an illustrative, non-exclusive example of a fuselage barrel that may form a portion of the aircraft of FIG. 1.

FIG. 1 is an illustrative, non-exclusive example of an aircraft 700 that includes a composite structure 800 that may be formed using the systems and methods according to the present disclosure, and FIG. 2 is an illustrative, non-exclusive example of a fuselage barrel 730 that may form a portion of aircraft 700 and includes composite structure 800. Aircraft 700 and/or composite structure 800 thereof may include a plurality of skin segments 790 that may form, cover, and/or be an outer surface of any suitable portion of aircraft 700. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800.

It is within the scope of the present disclosure that any suitable portion of aircraft 700 may be formed from and/or be composite structure 800. As illustrative, non-exclusive examples, composite structure 800 may form, or form a portion of, an airframe 710, a fuselage 720, a fuselage barrel 730, a wing 740, and/or a stabilizer 750 of aircraft 700.

Figure 3:
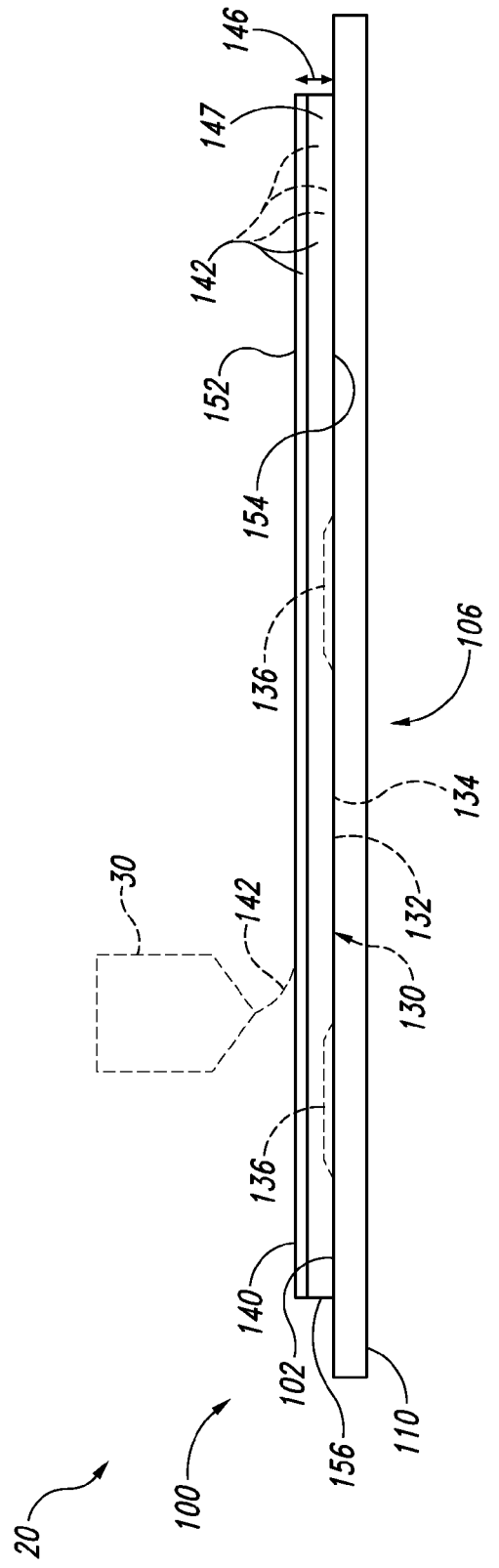
FIG. 3 is a schematic cross-sectional view of illustrative, non-exclusive examples of a composite-substrate assembly that may be included in and/or utilized with a composite structure manufacturing apparatus according to the present disclosure.

FIG. 3 is a schematic cross-sectional view of illustrative, non-exclusive examples of a composite-substrate assembly 100 according to the present disclosure that may be included in and/or utilized with a composite structure manufacturing apparatus 20 according to the present disclosure. Composite-substrate assembly 100 includes a charge of composite material 140 that is operatively attached to a flexible substrate 110 to define an interface 102 between charge of composite material 140 and flexible substrate 110.

Charge of composite material 140 may be operatively attached to flexible substrate 110 in any suitable manner. As an illustrative, non-exclusive example, charge of composite material 140 may be manually located on, manually placed in contact with, and/or manually adhered to flexible substrate 110. As another illustrative, non-exclusive example, and as illustrated in dashed lines in FIG. 3, a layup tool 30 may be utilized to locate and/or place a plurality of plies 142 of composite material on flexible substrate 110 to define charge of composite material 140. As yet another illustrative, non-exclusive example, an intermediate material 130 may be located between at least a portion of charge of composite material 140 and flexible substrate 110, and the charge of composite material and the flexible substrate both may be operatively attached to the intermediate material. Illustrative, non-exclusive examples of intermediate material 130 include a friction-modifying material 132, an adhesion-modifying material 134, and/or a flexible contact 136.

Figure 4:
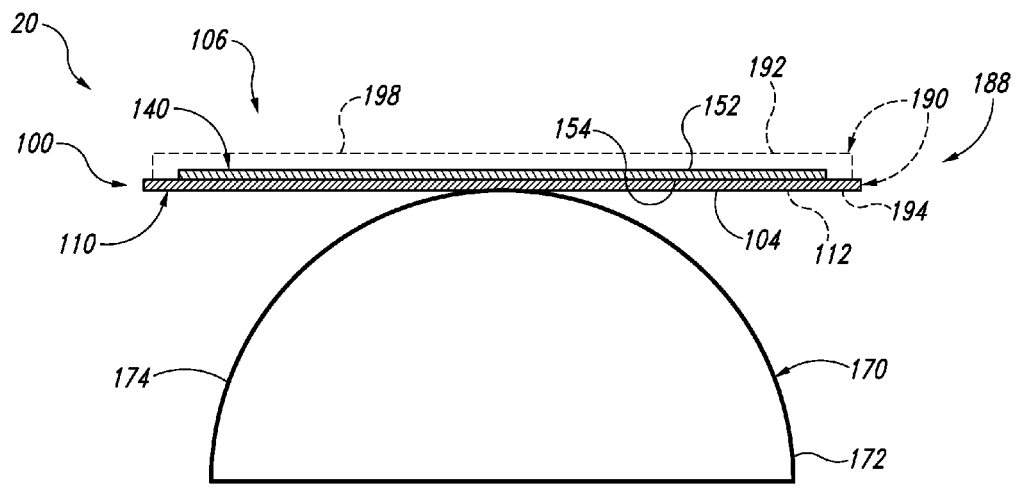
FIG. 4 is a schematic cross-sectional view of illustrative, non-exclusive examples of a composite-substrate assembly located with respect to a pre-forming mandrel according to the present disclosure.
Figure 5:
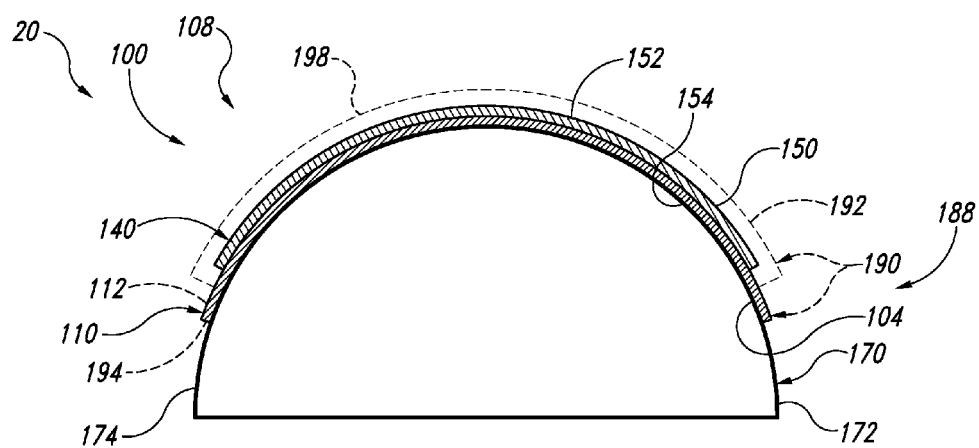
FIG. 5 is a schematic cross-sectional view of illustrative, non-exclusive examples of a composite-substrate assembly being deformed around a pre-forming mandrel according to the present disclosure.
Figure 9:
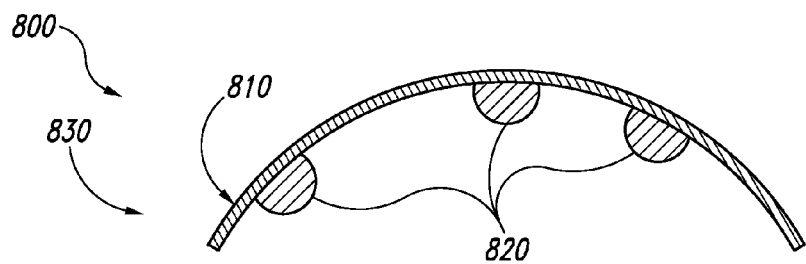
FIG. 9 is a schematic cross-sectional view of an illustrative, non-exclusive example of a composite structure according to the present disclosure.
Figure 10:
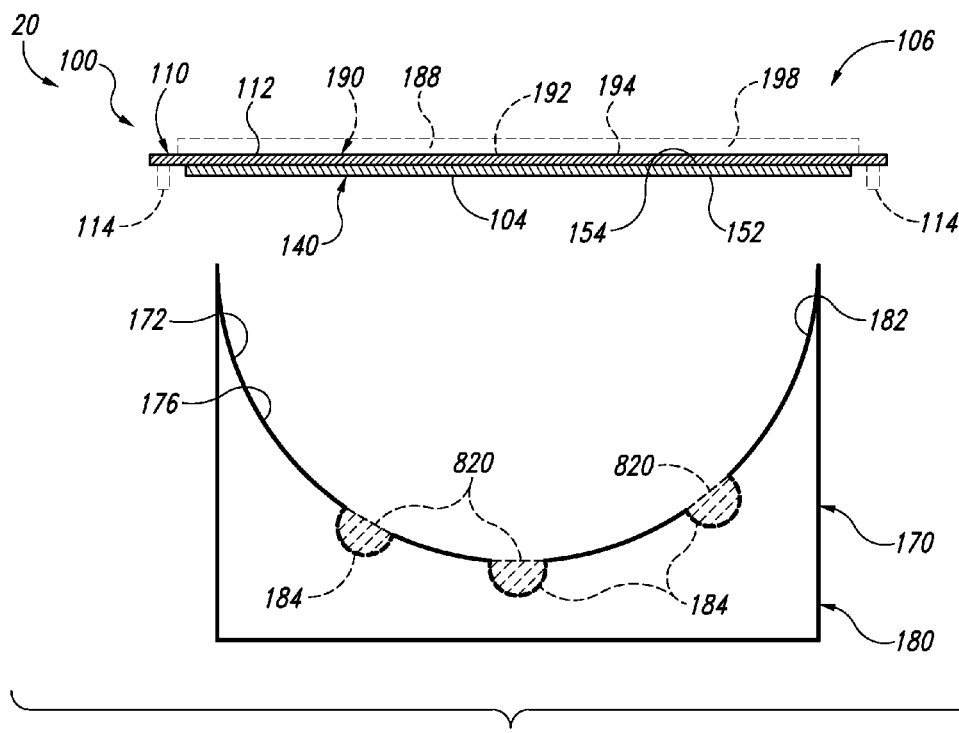
FIG. 10 is a schematic cross-sectional view of illustrative, non-exclusive examples of a composite-substrate assembly located with respect to a pre-forming mandrel according to the present disclosure.
Figure 11:
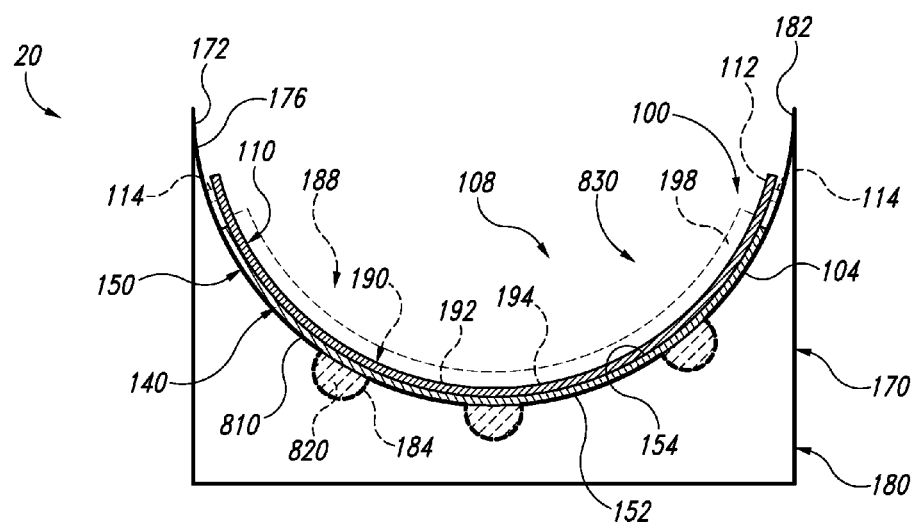
FIG. 11 is a schematic cross-sectional view of illustrative, non-exclusive examples of a composite-substrate assembly being deformed around a pre-forming mandrel according to the present disclosure.
Figure 12:
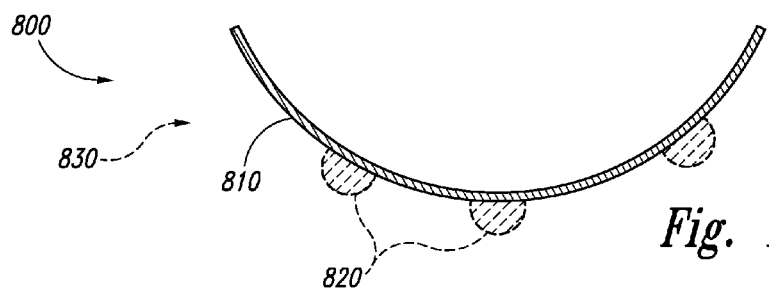
FIG. 12 is a schematic cross-sectional view of an illustrative, non-exclusive example of a composite structure according to the present disclosure.
Figure 13:
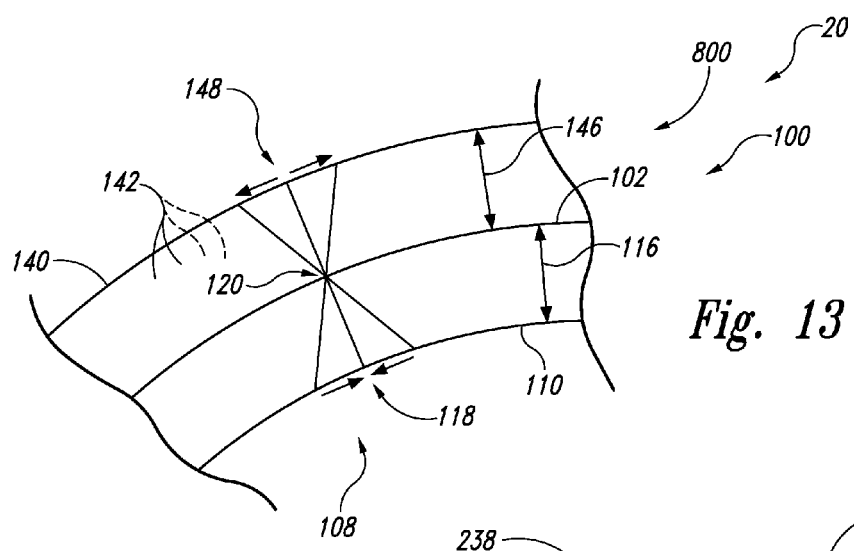
FIG. 13 is a schematic cross-sectional view of an illustrative, non-exclusive example of a composite-substrate assembly according to the present disclosure.

In addition, and as discussed in more detail herein with reference to FIGS. 4-13, flexible substrate 110, charge of composite material 140, and/or composite structure manufacturing apparatus 20 may be selected, configured, and/or utilized such that charge of composite material 140 is maintained in tension in a direction that is parallel to interface 102 when composite-substrate assembly 100 is deformed from the planar, or at least substantially planar, undeformed conformation 106 that is illustrated in FIG. 3 (such as to a deformed conformation 108 as illustrated in FIGS. 5, 11, and 13). This tension may permit deformation of composite-substrate assembly 100 (and thus deformation of charge of composite material 140) without damage to and/or wrinkling of charge of composite material 140.

As an illustrative, non-exclusive example, flexible substrate 110 may be configured to maintain charge of composite material 140 completely and/or fully in tension, such as across an entire thickness 146 and/or volume 147 thereof. As another illustrative, non-exclusive example, flexible substrate 110 may be configured to maintain at least a threshold fraction of a total volume of charge of composite material 140 in tension during deformation of composite-substrate assembly 100. Illustrative, non-exclusive examples of the threshold fraction of the total volume include at least at least 50%, at least 60%, at least 70%, at least 80%, at least 90%, at least 95%, at least 99%, or 100% of the total volume.

Charge of composite material 140 may include any suitable structure that is defined by a plurality of stacked plies 142 of composite material. Stacked plies 142 also may be referred to herein as composite plies 142, stacked composite plies 142, layered composite plies 142, plies 142, layers 142, and/or layered composite tape 142. Charge of composite material 140 also may be referred to herein as charge 140, composite charge 140, stack 140 of composite material, and/or stack 140 of composite plies. Charge 140 includes at least 2 stacked plies 142 and may include at least 3, at least 4, at least 6, at least 10, at least 15, at least 20, at least 30, at least 40, at least 50, or at least 60 stacked plies 142. Additionally or alternatively, charge 140 also may include fewer than 100, fewer than 90, fewer than 80, fewer than 70, fewer than 60, fewer than 50, or fewer than 40 stacked plies 142. Additionally or alternatively, charge 140 also may include one or more regions that include a different number of stacked plies 142 than one or more other regions thereof.

It is within the scope of the present disclosure that composite structure manufacturing apparatus 20 and/or charge 140 may be configured to permit and/or facilitate relative motion, or slipping, of one or more plies 142 within charge 140 relative to one or more other plies 142 during deformation of charge 140. As an illustrative, non-exclusive example, plies 142 may be cut and/or segmented to permit and/or facilitate this relative motion. As another illustrative, non-exclusive example, plies 142 may be oriented relative to one another to permit and/or facilitate this relative motion.

As discussed in more detail herein, the systems and methods according to the present disclosure may include forming a composite structure 800 from charge 140. As discussed in more detail herein with reference to FIGS. 1-2, composite structure 800 may include one or more skins, or skin segments, 790, and it is within the scope of the present disclosure that a given skin segment 790 may be fully defined by a given charge of composite material 140 and/or that the given charge of composite material 140 may define an entire thickness of the given skin segment.

Charge 140 may be a planar, or at least substantially planar, charge of composite material 140. As an illustrative, non-exclusive example, and as illustrated in FIG. 3, charge 140 may define two opposed sides 152 and 154, which also may be referred to herein as first side 152 and second side 154, that may be separated by the thickness 146 of the charge of composite material. As illustrated, first side 152 may form an exposed surface of composite-substrate assembly 100, while second side 154 may define a portion of interface 102. In addition, opposed sides 152 and 154, together with one or more edges 156, may define a surface area of charge 140, and it is within the scope of the present disclosure that opposed sides 152 and 154 may define at least a threshold fraction of the surface area of charge 140. As illustrative, non-exclusive examples, the threshold fraction of the surface area may be at least 50%, at least 60%, at least 70%, at least 75%, at least 80%, at least 85%, at least 90%, at least 95%, or at least 99% of the surface area of charge of composite material 140.

It is within the scope of the present disclosure that first side 152 and/or second side 154 may define any suitable area, or surface area. As illustrative, non-exclusive examples, the surface area may be at least 1 square meter, at least 2 square meters, at least 3 square meters, at least 4 square meters, at least 6 square meters, at least 8 square meters, at least 10 square meters, at least 12 square meters, at least 15 square meters, or at least 20 square meters. As additional illustrative, non-exclusive examples, the surface area of material contacting surface 114 may be fewer than 50 square meters, fewer than 45 square meters, fewer than 40 square meters, fewer than 35 square meters, fewer than 30 square meters, fewer than 25 square meters, or fewer than 20 square meters.

Charge of composite material 140 may be formed and/or defined from any suitable composite material. As an illustrative, non-exclusive example, charge 140 may include and/or be a plurality of fibers, a cloth, a plurality of fibers embedded in a resin material, and/or a cloth that is embedded in a resin material. As more specific but still illustrative, non-exclusive examples, charge 140 may include and/or be a pre-impregnated composite material and/or a pre-impregnated composite tape. Illustrative, non-exclusive examples of the plurality of fibers include a plurality of carbon fibers, a plurality of polymeric fibers, and/or a plurality of glass fibers. Illustrative, non-exclusive examples of the cloth include a cloth that is formed from the plurality of fibers. Illustrative, non-exclusive examples of the resin material include an epoxy, an adhesive, and/or a polymeric resin. As yet another illustrative, non-exclusive example, charge 140 also may include and/or be a viscoelastic material.

Flexible substrate 110 may include any suitable structure that may be selected and/or configured to support and/or be operatively attached to charge 140 to form, or define, composite-substrate assembly 100. In addition and as discussed herein, flexible substrate 110 is flexible and thereby permits deformation of composite-substrate assembly 100. Furthermore, flexible substrate 110 also maintains charge of composite material 140 in tension during deformation of composite-substrate assembly 100.

As illustrative, non-exclusive examples, flexible substrate 110 may include and/or be formed from a polymeric material, a plastic, a polycarbonate, a polyester, a metal, and/or aluminum. It is within the scope of the present disclosure that flexible substrate 110 may define a continuous and/or monolithic structure that may be solid and/or void-free. Additionally or alternatively, it is also within the scope of the present disclosure that flexible substrate 110 may define one or more voids therein and/or may define a panel and/or a double-walled panel, as discussed in more detail herein with reference to FIG. 14.

As another illustrative, non-exclusive example, flexible substrate 110 also may be referred to herein as and/or may be a sheet 110, a flexible sheet 110, a planar sheet 110, a planar substrate 110, and/or an at least substantially planar substrate 110. Additionally or alternatively, and similar to charge 140, flexible substrate 110 may define two opposed substrate sides and at least one substrate edge and the two opposed substrate sides may define at least a threshold fraction of a total surface area of the substrate. Illustrative, non-exclusive examples of the threshold fraction of the total surface area of the substrate may be at least 50%, at least 60%, at least 70%, at least 75%, at least 80%, at least 85%, at least 90%, at least 95%, or at least 99% of the total surface area of the substrate.

As discussed, flexible substrate 110 may be selected and/or configured to permit deformation of composite-substrate assembly 100. This may include deformation from an undeformed, or at least substantially undeformed, conformation 106 (as illustrated in FIGS. 3, 4, and 10) to a deformed conformation 108 (as illustrated in FIGS. 5 and 11). It is within the scope of the present disclosure that undeformed conformation 106 may include, define, and/or be a planar, or at least substantially planar, conformation. In contrast, deformed conformation 108, which is different from undeformed conformation 106, may include, define, and/or be a non-planar conformation that may correspond to a surface contour of a non-planar pre-forming device, as discussed in more detail herein.

Intermediate material 130, when present, may include and/or be any suitable material and/or structure that may change one or more properties of interface 102. As an illustrative, non-exclusive example, and when intermediate material 130 includes friction-modifying material 132, the friction-modifying material may be selected to change, modify, increase, and/or decrease a coefficient of friction between flexible substrate 110 and charge of composite material 140. This may change, modify, increase, and/or decrease a shear force that may be needed to initiate relative motion between charge of composite material 140 and flexible substrate 110.

As another illustrative, non-exclusive example, and when intermediate material 130 includes adhesion-modifying material 134, the adhesion-modifying material may be selected to change, modify, increase, and/or decrease an adhesion between flexible substrate 110 and charge of composite material 140. This may change, modify, increase, and/or decrease a normal force that may be needed to separate charge of composite material 140 from flexible substrate 110.

As yet another illustrative, non-exclusive example, and when intermediate material 130 includes flexible contact 136, the flexible contact may be selected and/or sized to change, modify, and/or define any suitable shape, contour, and/or surface contour of second side 154 of charge of composite material 140. As an illustrative, non-exclusive example, and as discussed in more detail herein, charge of composite material 140 may form a non-planar skin of a composite structure 800, and flexible contact 136 may define a portion of the shape, contour, and/or surface contour of one side of the non-planar skin. As another illustrative, non-exclusive example, and as discussed in more detail herein with reference to FIGS. 1-2, composite structure 800 further may include one or more additional elements, such as fillers 760, stringers 770, and/or frames 780, and flexible contact 136 may define the shape, contour and/or surface contour of the non-planar skin to be complementary to and/or to mate with the one or more additional elements. It is within the scope of the present disclosure that flexible contact 136 may be separate and/or distinct from flexible substrate 110 and may be operatively attached thereto. However, it is also within the scope of the present discourse that flexible contact 136 may be defined by flexible substrate 110.

FIGS. 4-12 provide illustrative, non-exclusive examples of process flows for a composite structure manufacturing apparatus 20 according to the present disclosure. Composite structure manufacturing apparatus 20 may include and/or utilize composite-substrate assemblies 100 to create and/or fabricate composite structures 800. As discussed in more detail herein, this fabrication may include conforming a surface 104 of composite-substrate assembly 100 to a non-planar pre-forming surface 172 of a pre-forming mandrel 170. This conforming may define a non-planar skin surface contour on a surface 152/154 of charge of composite material 140.

Figure 6:
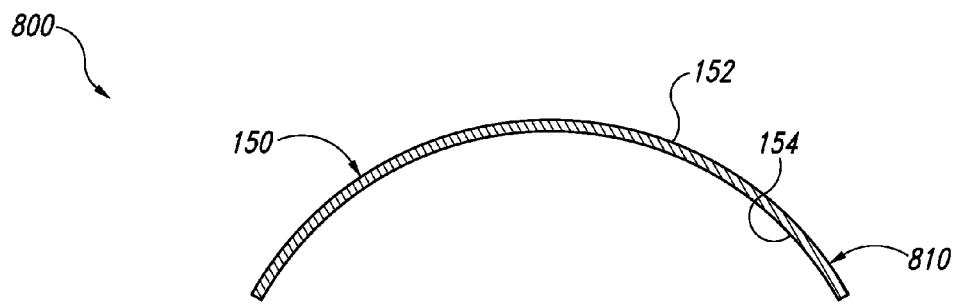
FIG. 6 is a schematic cross-sectional view of an illustrative, non-exclusive example of a non-planar skin according to the present disclosure.
Figure 7:
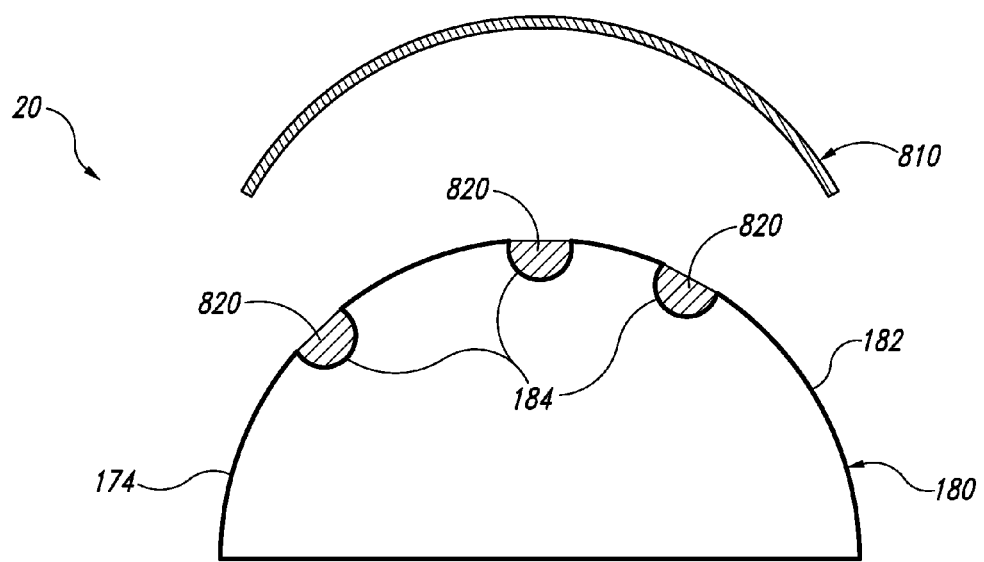
FIG. 7 is a schematic cross-sectional view of an illustrative, non-exclusive example of a non-planar skin proximal to a layup mandrel that includes a plurality of stiffening elements according to the present disclosure.
Figure 8:
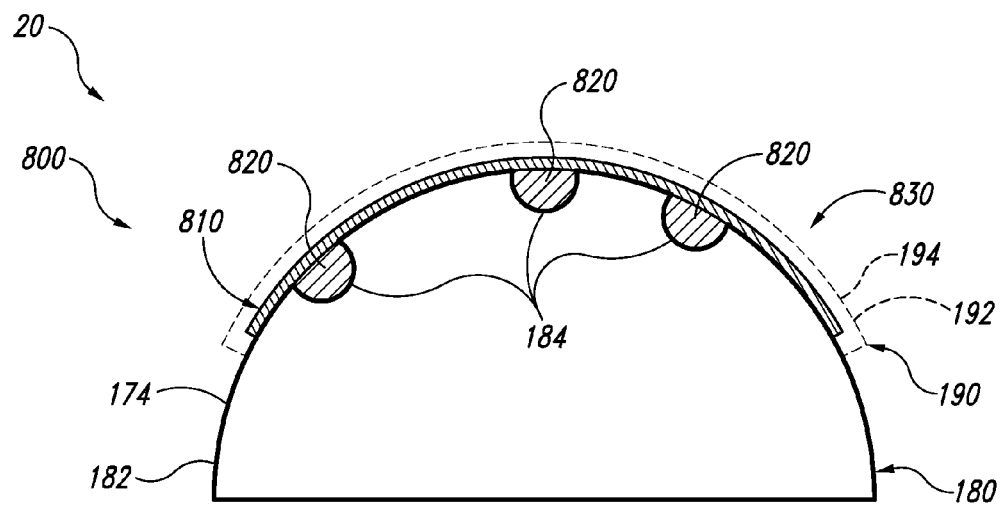
FIG. 8 is a schematic cross-sectional view of illustrative, non-exclusive examples of a non-planar skin located with respect to a layup mandrel that includes a plurality of stiffening elements according to the present disclosure.

The process flow of FIGS. 4-9 utilizes a convex 174 pre-forming mandrel 170 (as illustrated in FIGS. 4-5) and/or a convex 174 layup mandrel 180 (as illustrated in FIGS. 7-8) to form composite structure 800. In contrast, the process flow of FIGS. 10-12 utilizes a concave 176 pre-forming mandrel 170 and/or a concave 176 layup mandrel 180 (as illustrated in FIGS. 10-11) to form composite structure 800.

Convex 174 pre-forming mandrel 170 also may be referred to herein as an inner mold line (IML) pre-forming mandrel 170. Convex 174 layup mandrel 180 also may be referred to herein as an inner mold line (IML) layup mandrel 180. Concave 176 pre-forming mandrel 170 also may be referred to herein as an outer mold line (OML) pre-forming mandrel 170. Concave 176 layup mandrel 180 also may be referred to herein as an outer mold line (OML) layup mandrel 180.

In the illustrative, non-exclusive process flow of FIGS. 4-9, composite-substrate assembly 100 initially may be in undeformed conformation 106, as illustrated in FIG. 4. In FIG. 4, composite-substrate assembly 100 may be located relative to convex 174 pre-forming mandrel 170 such that flexible substrate 110 is oriented between charge of composite material 140 and pre-forming mandrel 170. This relative orientation of composite-substrate assembly 100 may permit charge 140 to remain in tension during subsequent deformation of composite-substrate assembly 100 to deformed conformation 108, as illustrated in FIG. 5. As discussed, this deformation may include conforming surface 104 of composite-substrate assembly 100 to non-planar pre-forming surface 172 of pre-forming mandrel 170 to define deformed charge of composite material 150, as also illustrated in FIG. 5.

As illustrated in dashed lines in FIGS. 4-5, composite structure manufacturing apparatus 20 also may include and/or be associated with a heating assembly 198. Heating assembly 198 may include any suitable structure, such as a heat blanket, that may be selected and/or configured to heat substrate 110 and/or to heat charge 140. As an illustrative, non-exclusive example, this heating may include heating to increase a rate at which composite-substrate assembly 100 (and/or charge 140 thereof) deforms from undeformed conformation 106 to deformed conformation 108. As another illustrative, non-exclusive example, the heating may include heating to at least partially cure, to B-stage cure, or to fully cure charge 140. As yet another illustrative, non-exclusive example, and when charge 140 includes and/or is a viscoelastic material, the heating may include releasing residual stress within charge 140, such as subsequent to deformation thereof.

It is within the scope of the present disclosure that heating assembly 198 may be utilized to heat substrate 110 and/or charge 140 at any suitable time during the process flow of FIGS. 4-9. As an illustrative, non-exclusive example, substrate 110 and/or charge 140 may be heated prior to deformation of composite-substrate assembly 100 (as illustrated in FIG. 4). As another illustrative, non-exclusive example, substrate 110 and/or charge 140 may be heated during and/or subsequent to deformation of composite-substrate assembly 100 (as illustrated in FIG. 5).

As also illustrated in dashed lines in FIGS. 4-5, composite structure manufacturing apparatus 20 also may include a vacuum assembly 190. Vacuum assembly 190 may be selected and/or configured to compact charge of composite material 140 on flexible substrate 110. Additionally or alternatively, vacuum assembly 190 also may be configured to maintain and/or to regulate the operative attachment between flexible substrate 110 and charge of composite material 140 during deformation of composite-substrate assembly 100 from undeformed conformation 106 to deformed conformation 108. This may include regulating a pressure force that may be applied to composite-substrate assembly 100, as discussed in more detail herein.

It is within the scope of the present disclosure that vacuum assembly 190 may include any suitable structure. As an illustrative, non-exclusive example, vacuum assembly 190 may include and/or be a vacuum bag 192 that covers an exposed surface (such as first side 152) of charge 140 and/or that encloses charge 140. As another illustrative, non-exclusive example, vacuum assembly 190 may include and/or be a flexible vacuum chuck 194 that may be at least partially defined by a vacuum manifold 112 that may be associated with, internal to, and/or defined by flexible substrate 110 (as discussed in more detail herein with reference to FIG. 14). As an illustrative, non-exclusive example, flexible vacuum chuck 194 may be configured to apply a vacuum to interface 102 to retain charge 140 on substrate 110. As yet another illustrative, non-exclusive example, vacuum assembly 190 may be at least substantially similar to flexible substrate 110.

It is within the scope of the present disclosure that vacuum assembly 190 may be utilized to vacuum compact charge of composite material 140 on flexible substrate 110 at any suitable time during the process flow of FIGS. 4-9. As an illustrative, non-exclusive example, charge of composite material 140 may be vacuum compacted on flexible substrate 110 prior to deformation of composite-substrate assembly 100 (as illustrated in FIG. 4). As another illustrative, non-exclusive example, charge of composite material 140 may be vacuum compacted on flexible substrate 110 during and/or subsequent to deformation of composite-substrate assembly 100 (as illustrated in FIG. 5).

As also illustrated in dashed lines in FIGS. 4-5, composite structure manufacturing apparatus 20 further may include and/or be associated with an interfacial force control assembly 188. Interfacial force control assembly 188 may include any suitable structure that is configured to control, or regulate, a maximum interfacial force that may be applied to interface 102 without relative motion between substrate 110 and charge 140. As an illustrative, non-exclusive example, interfacial force control assembly 188 may include and/or be in fluid communication with vacuum assembly 190 and may control a pressure within vacuum assembly 190 to regulate the maximum interfacial force. This may include increasing the vacuum (or decreasing the pressure) within vacuum assembly 190 to increase the maximum interfacial force and/or decreasing the vacuum (or increasing the pressure) within vacuum assembly 190 to decrease the maximum interfacial force.

As use herein, the phrase, "interfacial force" may include any suitable force (or portion of a force) that may be applied to interface 102 in a direction that is parallel to interface 102 and/or tangential to interface 102. As an illustrative, non-exclusive example, this interfacial force may be generated by, during, and/or as a result of deformation of composite-substrate assembly 100. When the interfacial force exceeds the maximum interfacial force, charge 140 and substrate 110 may slip and/or otherwise translate relative to one another at, near, and/or along interface 102. It is within the scope of the present disclosure that the (maximum) interfacial force also may be referred to herein as a (maximum) shear stress, a (maximum) slippage force, and/or a (maximum) tangential force.

As illustrated in FIG. 6, and subsequent to deformation of charge 140 to define deformed charge 150, charge of composite material 140 may be separated from pre-forming mandrel 170 and/or may be separated from composite-substrate assembly 100 to define a non-planar skin 810. As illustrated, composite structure manufacturing apparatus 20 may be configured such that first side 152 and/or second side 154 of non-planar skin 810 may maintain a surface contour that corresponds to the surface contour of non-planar pre-forming surface 172 despite separation of non-planar skin 810 from pre-forming mandrel 170. In contrast, flexible substrate 110 may be configured to return to a planar, or at least substantially planar, conformation subsequent to separation from charge 140 and pre-forming mandrel 170.

It is within the scope of the present disclosure that non-planar skin 810 may be a finished and/or completed composite structure 800. However, it is also within the scope of the present disclosure that non-planar skin 810 may form a portion of a larger composite structure 800 and/or that non-planar skin 810 subsequently may be operatively attached to one or more additional components of larger composite structure 800. As an illustrative, non-exclusive example, non-planar skin 810 may form a portion of aircraft 700 (as illustrated in FIGS. 1-2). When non-planar skin 810 forms a portion of aircraft 700, non-planar skin 810 also may be referred to herein as skin segment 790 (as illustrated in FIGS. 1-2).

As an illustrative, non-exclusive example, and as illustrated in FIG. 7, composite structure manufacturing apparatus 20 further may include a layup mandrel 180. Layup mandrel 180 may define a non-planar mandrel surface 182, or a non-planar mandrel surface contour 182, and a plurality of stiffening element recesses 184, which may be configured to receive a plurality of stiffening elements 820. Subsequent to location of stiffening elements 820 within stiffening element recesses 184, non-planar skin 810 may be located and/or received on layup mandrel 180, as illustrated in FIG. 8, to form a stiffened skin assembly 830. This may include forming a physical and/or mechanical contact between non-planar skin 810 and layup mandrel 180 (or non-planar mandrel surface 182 thereof) and/or forming a physical and/or mechanical contact between non-planar skin 810 and stiffening elements 820 that may be located within stiffening element recesses 184.

In addition, and as illustrated in dashed lines in FIG. 8, a vacuum assembly 190 may, at least temporarily, cover non-planar skin 810. Vacuum assembly 190 may be utilized to vacuum compact non-planar skin 810 to layup mandrel 180 and/or to stiffening elements 820, thereby increasing an adhesion therebetween. Illustrative, non-exclusive examples of vacuum assemblies 190 include vacuum bag 192 and/or flexible vacuum chuck 194, which are discussed in more detail herein. Subsequent to formation of stiffened skin assembly 830, the entire assembly subsequently may be cured to harden the stiffened skin assembly, to fix a conformation of the stiffened skin assembly, and/or to increase an adhesion between non-planar skin 810 and stiffening element 820.

It is within the scope of the present disclosure that stiffening elements 820 may include and/or be any suitable structure that may be selected and/or configured to stiffen, or increase the rigidity of, a composite structure 800 that includes non-planar skin 810 and stiffening elements 820. As an illustrative, non-exclusive example, and when composite structure 800 forms a portion of an aircraft 700, stiffening elements 820 may include and/or be stringers 790 (as illustrated in FIGS. 1-2).

Subsequent to formation and/or curing of stiffened skin assembly 830, and as illustrated in FIG. 9, non-planar skin 810 and stiffening elements 820 may be removed from layup mandrel 180 to produce composite structure 800. It is within the scope of the present disclosure that, as illustrated in FIGS. 4-5 and 7-8, pre-forming mandrel 170 and layup mandrel 180 may be separate and/or distinct structures. This may include separate and/or distinct structures that may define different respective surface contours and/or that may define different features, as well as separate and/or distinct structures that may define similar, or at least substantially similar, surface contours and/or features. Additionally or alternatively, it is also within the scope of the present disclosure that pre-forming mandrel 170 and layup mandrel 180 may be the same structure, as illustrated in FIGS. 10-12 and discussed herein.

FIGS. 10-12 provide illustrative, non-exclusive examples of a process flow for a composite structure manufacturing apparatus 20 in which pre-forming mandrel 170 and/or layup mandrel 180 define a concave 176 surface, or surface contour (172 and 182, respectively). As illustrated in FIG. 10, composite-substrate assembly 100 initially may be in undeformed conformation 106 and may be located relative to concave 176 pre-forming mandrel 170 and/or layup mandrel 180 such that charge of composite material 140 is located between flexible substrate 110 and pre-forming mandrel 170 and/or layup mandrel 180. This relative orientation of composite-substrate assembly 100 may permit charge 140 to remain in tension during subsequent deformation of composite-substrate assembly 100 to deformed conformation 108, as illustrated in FIG. 11. This deformation may include formation of deformed charge of composite material 150 (or non-planar skin 810) from charge 140. As illustrated, non-planar skin 810 optionally may form a portion of a stiffened skin assembly 830 that also may include stiffening elements 820.

The process flow of FIGS. 10-12 may be utilized in several ways. As a first illustrative, non-exclusive example, and as illustrated in dashed lines in FIGS. 10-11, the process flow may utilize a layup mandrel 180 that defines a plurality of stiffening element recesses 184 that may have a plurality of stiffening elements 820 received therein. Thus, and subsequent to deformation of composite-substrate assembly 100 to conform to non-planar mandrel surface contour 182, deformed charge of composite material 150 may be in physical and/or mechanical contact with both stiffening elements 820 and layup mandrel 180 (or non-planar mandrel surface contour 182 thereof).

As a second illustrative, non-exclusive example, the process flow of FIGS. 10-12 may utilize a pre-forming mandrel 170 that does not define the plurality of stiffening element recesses. Thus, and subsequent to deformation of composite-substrate assembly 100 to conform to non-planar pre-forming surface 172, deformed charge of composite material 150 may be in physical and/or mechanical contact with pre-forming mandrel 170 (or non-planar pre-forming surface 172 thereof).

As discussed herein with reference to FIGS. 4-9, the deformation of composite-substrate assembly 100 may be accomplished in any suitable manner, including through the use of a heating assembly 198, a shear stress control assembly 188, and/or a vacuum assembly 190. When composite structure manufacturing apparatus 20 includes and/or utilizes vacuum assembly 190 that includes flexible vacuum chuck 194, composite structure manufacturing apparatus 20 (and/or composite-substrate assembly 100 thereof) further may include a compliant seal 114. Compliant seal 114 may be configured to form a fluid seal between flexible substrate 110 and layup mandrel 180 to permit formation of a vacuum therebetween.

Returning to the first example, and subsequent to deformation of composite-substrate assembly 100 to produce deformed charge of composite material 150, the assembly may be cured to produce stiffened skin assembly 830 that includes non-planar skin 810 and stiffening elements 820. Then, and as illustrated in FIG. 12, non-planar skin 810 and stiffening elements 820 may be separated from flexible substrate 110 and/or from layup mandrel 180 to produce composite structure 800 that includes stiffening elements 820 on a convex surface thereof. Composite structure 800 of FIG. 12 may include and/or be any suitable composite structure, illustrative, non-exclusive examples of which are discussed herein with reference to FIGS. 1-2, 6, and 9.

Returning to the second example, and subsequent to deformation of composite-substrate assembly 100 to produce deformed charge of composite material 150, the deformed charge of composite material may be separated from flexible substrate 110 and/or from pre-forming mandrel 170 to produce non-planar skin 810 (as illustrated in FIG. 12). Non-planar skin 810 then may be utilized with the process flow of FIGS. 7-9 to produce composite structure 800 that includes stiffening elements 820 on a concave surface thereof.

FIG. 13 is a schematic cross-sectional view of an illustrative, non-exclusive example of a composite-substrate assembly 100 according to the present disclosure that may be included in, utilized with, and/or form a portion of composite manufacturing apparatus 20. In FIG. 13, composite-substrate assembly 100 includes a flexible substrate 110 and a charge of composite material 140 that includes a plurality of stacked plies 142 of composite material. Charge of composite material 140 is operatively attached to flexible substrate 110 to form an interface 102 therebetween and the composite-substrate assembly is pictured in a deformed conformation 108 in which charge 140 is maintained in tension, as indicated at 148.

When composite-substrate assembly 100 is in deformed conformation 108, a portion of composite-substrate assembly 100 will be in tension (as indicated at 148), while a portion of composite-substrate assembly 100 will be in compression (as indicated at 118). In general, compression, or at least significant compression, of charge 140 may be undesirable and/or may be detrimental to the performance of a composite structure 800 that may be formed therefrom. This may be due to the formation of voids and/or wrinkles within charge 140 during compression thereof.

However, in composite-substrate assembly 100, tension within charge 140 is maintained, or generated, by selecting an overall composition, construction, and/or geometry of composite-substrate assembly 100 such that flexible substrate 110 carries a majority and/or all of the compression, as indicated at 118. This may include orienting composite-substrate assembly 100 such that a radius of curvature of charge 140 is greater than a radius of curvature of flexible substrate 110 when composite-substrate assembly 100 is in deformed conformation 108.

Additionally or alternatively, the systems and methods according to the present disclosure also may include selecting the overall composition, construction, and/or geometry of composite-substrate assembly 100 such that a tension-compression crossover point 120 is located at interface 102, near interface 102, outside of charge of composite material 140, and/or within flexible substrate 110. As discussed in more detail herein with reference to methods 300, this may include selecting a thickness 116 of flexible substrate 110, a thickness 146 of charge 140, and/or one or more material properties of flexible substrate 110 and/or charge 140 such that charge 140 is maintained in tension during deformation of composite-substrate assembly 100.

Figure 14:
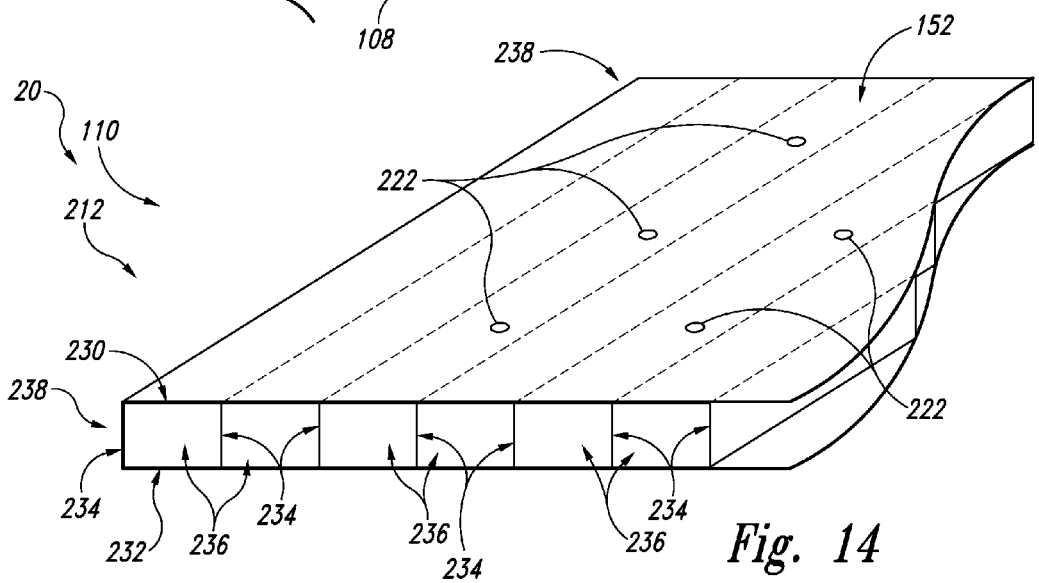
FIG. 14 is a less schematic but still illustrative, non-exclusive example of a flexible substrate that may be utilized with and/or included in the systems and methods according to the present disclosure.

FIG. 14 is a less schematic but still illustrative, non-exclusive example of a flexible substrate 110 that may be utilized with and/or included in the systems and methods according to the present disclosure. It is within the scope of the present disclosure that flexible substrate 110 of FIG. 14 may be utilized with any of the composite structure manufacturing apparatus 20 that are disclosed herein with reference to any of FIGS. 3-13.

Flexible substrate 110 of FIG. 14 includes a first planar wall 230, a second, opposed planar wall 232, and a plurality of elongate webs 234 that extend between first planar wall 230 and second planar wall 232. Such a flexible substrate 110 also may be referred to herein as a panel 212 and/or as a double-walled panel 212. Planar walls 230 and 232, together with the plurality of elongate webs 234, define a plurality of elongate channels 236 that extend within flexible substrate 110 and may function as vacuum manifold 112 (as illustrated in FIGS. 4-5 and 10-11). As illustrated in FIG. 14, elongate channels 236 may be in fluid communication with a plurality of air holes 222, which may provide fluid communication between elongate channels 236 and interface 102 when charge of composite material 140 is operatively attached to first side 152 of flexible substrate 110 (as illustrated in FIG. 3).

It is within the scope of the present disclosure that channels 236 may extend along a longitudinal axis that is parallel to first planar wall 230 and/or second planar wall 232, may extend from an edge 238 of flexible substrate 110, may extend from a first edge of flexible substrate 110 to a second edge of flexible substrate 110, and/or may extend between two opposed edges of flexible substrate 110.

Figure 15:
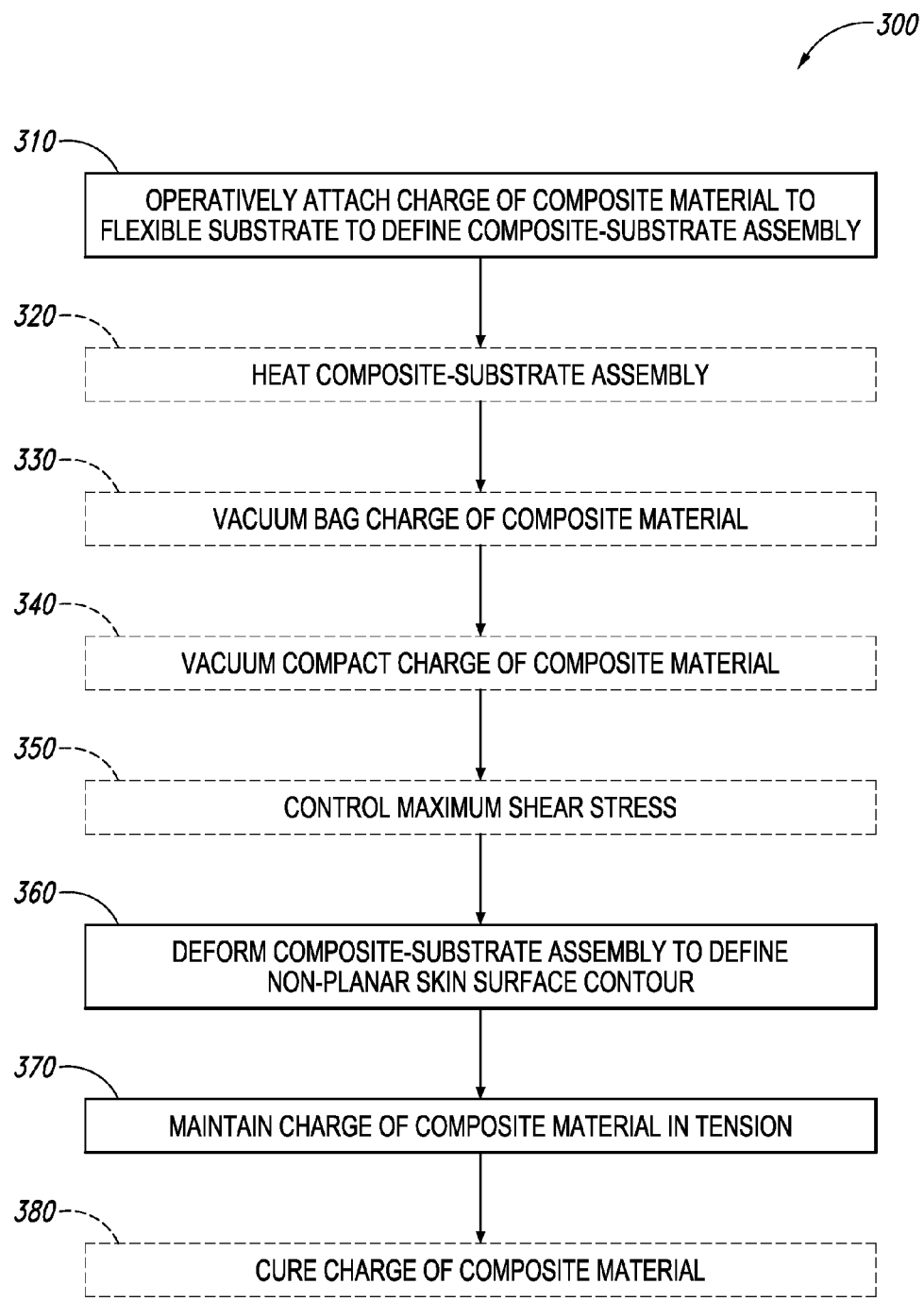
FIG. 15 is a flowchart depicting methods according to the present disclosure of defining a non-planar skin surface contour of a skin for a composite structure.

FIG. 15 is a flowchart depicting methods 300 according to the present disclosure of defining a non-planar skin surface contour of a skin for a composite structure. Methods 300 include operatively attaching a charge of composite material to a flexible substrate to define a composite-substrate assembly at 310 and may include heating the composite-substrate assemble at 320, vacuum bagging the charge of composite material at 330, vacuum compacting the charge of composite material at 340, and/or controlling a maximum interfacial force that may be applied at an interface between the charge of composite material and the flexible substrate at 350. Methods 300 further include deforming the composite-substrate assembly to define a non-planar skin surface contour at 360 and maintaining the charge of composite material in tension at 370. Methods 300 also may include curing the charge of composite material at 380.

Operatively attaching the charge of composite material to the flexible substrate to define the composite-substrate assembly at 310 may include attaching any suitable charge of composite material (such as charge of composite material 140) to any suitable flexible substrate (such as flexible substrate 110). As an illustrative, non-exclusive example, the operatively attaching at 310 may include temporarily and/or releasably coupling the charge of composite material to the flexible substrate, such as during a remainder of methods 300. During the operatively attaching at 310, the flexible substrate may define an undeformed conformation, such as a planar, or at least substantially planar, conformation. However, the flexible substrate subsequently may be deformed to a deformed conformation that is different from the undeformed conformation, such as during the deforming at 360.

It is within the scope of the present disclosure that the operatively attaching at 310 may include operatively attaching in any suitable manner. As an illustrative, non-exclusive example, the operatively attaching at 310 may include laying up the charge of composite material on the flexible substrate. This may include laying up with a layup tool (such as layup tool 30).

As another illustrative, non-exclusive example, the operatively attaching at 310 also may include placing and/or locating the charge of composite material on the flexible substrate. As yet another illustrative, non-exclusive example, the operatively attaching at 310 may include operatively attaching the charge of composite material to a flexible contact, such as flexible contact 136, that is defined by the flexible substrate and/or that is operatively attached to the flexible substrate.

Additionally or alternatively, the operatively attaching also may include increasing an adhesion between the charge of composite material and the flexible substrate. This may include applying a vacuum between the charge of composite material and the flexible substrate (such as through the use of vacuum assembly 190, vacuum manifold 112, and/or flexible vacuum chuck 194). Additionally or alternatively, this also may include vacuum bagging the charge of composite material on the flexible substrate (such as though the use of vacuum bag 192).

Heating the composite-substrate assembly at 320 may include the use of any suitable structure (such as heating assembly 198) to heat the composite substrate assembly and/or the charge of composite material. It is within the scope of the present disclosure that the heating may include heating prior to the vacuum compacting at 340, heating during the vacuum compacting at 340, heating subsequent to the vacuum compacting at 340, heating prior to the deforming at 360, heating during the deforming at 360, heating subsequent to the deforming at 360, heating to accelerated the deforming at 360, and/or heating to produce, or generate, the deforming at 360.

Vacuum bagging the charge of composite material at 330 may include the use of any suitable structure (such as vacuum assembly 190 and/or vacuum bag 192) to vacuum bag the charge of composite material. As an illustrative, non-exclusive example, and as discussed, the vacuum bagging may include vacuum bagging to increase adhesion between the charge of composite material and the flexible substrate. As another illustrative, non-exclusive example, the vacuum bagging may include vacuum bagging prior to the deforming at 360, such as to retain the charge of composite material in contact with the flexible substrate during the deforming at 360. As yet another illustrative, non-exclusive example, the vacuum bagging at 360 may include vacuum bagging to produce, or generate, the vacuum compacting at 340. This may include vacuum compacting the charge of composite material to the flexible substrate prior to, during, and/or subsequent to the deforming at 360.

Controlling the maximum interfacial force that may be applied at the interface between the charge of composite material and the flexible substrate at 350 may include controlling the maximum interfacial force in any suitable manner. As an illustrative, non-exclusive example, the controlling at 350 may include controlling to prevent and/or to regulate relative motion between the charge of composite material and the flexible substrate. This may include preventing, controlling, actively controlling, and/or regulating the relative motion during, or concurrently with, the deforming at 360.

As an illustrative, non-exclusive example, methods 300 may include applying a vacuum between the flexible substrate and the charge of composite material, and the controlling at 350 may include adjusting the vacuum during the deforming at 360. This may include increasing the vacuum to increase the maximum interfacial force (such as to resist and/or limit the relative motion) and/or decreasing the vacuum to decrease the maximum interfacial force (such as to permit at least a threshold amount of relative motion). As an illustrative, non-exclusive example, the vacuum may be applied with a vacuum manifold that is defined by the flexible substrate (such as vacuum manifold 112). As another illustrative, non-exclusive example, the vacuum may be applied with a vacuum bag assembly (such as vacuum bag 192).

Deforming the composite-substrate assembly to define the non-planar skin surface contour at 360 may include conforming the composite-substrate assembly to a non-planar pre-forming surface of a pre-forming mandrel (such as to non-planar pre-forming surface 172 of pre-forming mandrel 170). Additionally or alternatively, the deforming at 360 also may include defining a deformed charge of composite material (such as deformed charge of composite material 150) that includes, or defines, the non-planar skin surface contour. As an illustrative, non-exclusive example, the deforming at 360 may include contouring a surface of the charge of composite material from an initial contour to the non-planar skin surface contour that is different from the initial contour (which may be planar, or at least substantially planar).

As another illustrative, non-exclusive example, the deforming at 360 also may include applying a deformation force to the composite-substrate assembly. It is within the scope of the present disclosure that the deformation force may be applied and/or generated in any suitable manner. As illustrative, non-exclusive examples, the deformation force may include and/or be a gravitational force, a mechanical force, a pressure force, a pneumatic force, a hydraulic force, and/or a vacuum force.

It is within the scope of the present disclosure that the deforming at 360 further may include regulating, or controlling, a rate of the deforming, a length of time during which the deforming occurs, and/or a magnitude of the deformation force. As an illustrative, non-exclusive example, this may include regulating, or controlling, to maintain operative attachment between the charge of composite material and the flexible substrate during the deforming at 360. As another illustrative, non-exclusive example, this also may include regulating, or controlling, to avoid, or prevent, separation of the charge of composite material from the flexible substrate during the deforming at 360.

Maintaining the charge of composite material in tension at 370 may include maintaining the charge of composite material in tension during the deforming at 360 and/or maintaining the charge of composite material in tension in a direction that is parallel to the interface between the charge of composite material and the flexible substrate. As an illustrative, non-exclusive example, the maintaining may include maintaining to prevent wrinkling of the charge of composite material during the deforming at 360.

As another illustrative, non-exclusive example, the maintaining may include selecting and/or configuring the flexible substrate and/or the charge of composite material such that the charge of composite material remains in tension during the deforming at 360. This may include selecting and/or configuring the flexible substrate and/or the charge of composite material based upon any suitable property of the flexible substrate and/or of the charge of composite material, illustrative, non-exclusive examples of which include a thickness of the flexible substrate and/or of the charge of composite material, a Young's modulus of the flexible substrate and/or of the charge of composite material, a viscoelasticity of the charge of composite material, a material composition of the flexible substrate and/or of the charge of composite material, a number, or maximum number, of plies in a plurality of stacked plies that defines the charge of composite material, an orientation of individual plies within the plurality of stacked plies, and/or the maximum interfacial force that may be applied to the interface between the charge of composite material and the flexible substrate without relative motion therebetween.

It is within the scope of the present discourse that the maintaining at 370 may include maintaining any suitable portion, or fraction, of the charge of composite material in tension. As an illustrative, non-exclusive example, the maintaining at 370 may include maintaining the charge of composite material completely, fully, and/or entirely in tension, such as throughout a total volume thereof. As another illustrative, non-exclusive example, the maintaining at 370 also may include maintaining the charge of composite material in tension across an entire thickness thereof. As yet another illustrative, non-exclusive example, the maintaining at 370 may include maintaining at least a threshold fraction of the total volume of the charge of composite material in tension. Illustrative, non-exclusive examples of the threshold fraction of the total volume include at least 50%, at least 60%, at least 70%, at least 80%, at least 90%, at least 95%, at least 99%, or 100% of the total volume.

As discussed in more detail herein, the deforming at 360 may include deforming the charge of composite material on a convex surface contour or on a concave surface contour. When the deforming at 360 includes deforming on a convex surface contour, the maintaining at 370 further may include locating the flexible substrate between the pre-forming mandrel and the charge of composite material during the deforming at 360. Alternatively, and when the deforming at 360 includes deforming on a concave surface contour, the maintaining at 370 may include locating the charge of composite material between the flexible substrate and the pre-forming mandrel during the deforming at 360.

Curing the charge of composite material at 380 may include at least partially curing the charge of composite material subsequent to the deforming. As illustrative, non-exclusive examples, the curing at 380 may include B-stage curing the charge of composite material or completely curing the charge of composite material. As an additional illustrative, non-exclusive example, the curing at 380 also may include heating the charge of composite material, such as by the heating at 320.

Figure 16:
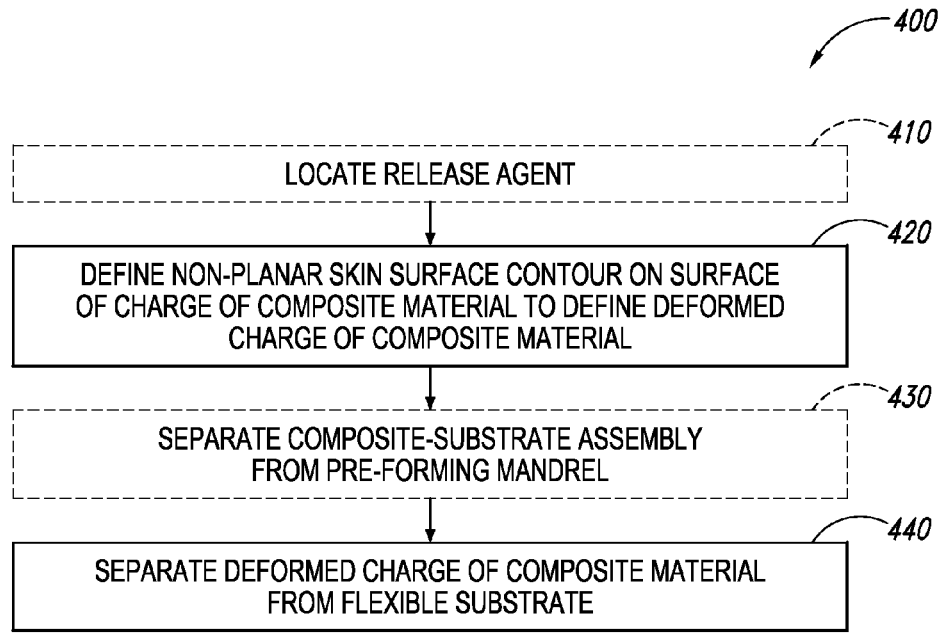
FIG. 16 is a flowchart depicting methods according to the present disclosure of forming a non-planar skin for a composite structure.

FIG. 16 is a flowchart depicting methods 400 according to the present disclosure of forming a non-planar skin for a composite structure. Methods 400 may include locating a release agent between a charge of composite material and a flexible substrate at 410 and include defining a non-planar skin surface contour on a surface of the charge of composite material to define a deformed charge of composite material at 420. Methods 400 further may include separating a composite-substrate assembly from a pre-forming mandrel at 430 and include separating the deformed charge of composite material from the flexible substrate at 440.

Locating the release agent between the charge of composite material and the flexible substrate at 410 may include locating any suitable release agent between the charge of composite material and the flexible substrate prior to operatively attaching the charge of composite material to the flexible substrate to form the composite-substrate assembly. The release agent may be selected and/or configured to permit, facilitate, and/or improve the separating at 440. When methods 400 include the locating at 410, the separating at 440 may include separating the charge of composite material from the release agent and/or separating the flexible substrate from the release agent.

Defining the non-planar skin surface contour on the surface of the charge of composite material to define the deformed charge of composite material at 420 may include defining the non-planar skin surface contour in any suitable manner. As an illustrative, non-exclusive example, the defining at 420 may include performing methods 300 to define the non-planar skin surface contour. This may include deforming the composite-substrate assembly by conforming the composite-substrate assembly to a non-planar pre-forming surface of a pre-forming mandrel to define the non-planar skin surface contour, as discussed in more detail herein.

Separating the composite-substrate assembly from the pre-forming mandrel at 430 may include separating the composite-substrate assembly from the pre-forming mandrel in any suitable manner. As an illustrative, non-exclusive example, the separating at 430 may include spatially separating the composite-substrate assembly from the pre-forming mandrel. As another illustrating, non-exclusive example, the separating at 430 may be performed prior to the separating at 440 and/or may be performed to permit the separating at 440.

Separating the deformed charge of composite material from the flexible substrate at 440 may include separating to define a non-planar skin (such as non-planar skin 810) that may form a portion of and/or may be a composite structure (such as composite structure 800). As discussed in more detail herein, the defining at 420 may include deforming the flexible substrate to a deformed conformation and the separating at 440 may include returning the flexible substrate to an undeformed conformation that is different from the deformed conformation.

It is within the scope of the present disclosure that the separating at 440 may be accomplished in any suitable manner. As an illustrative, non-exclusive example, the separating at 440 may include mechanically peeling the flexible substrate from the non-planar skin and/or mechanically peeling the non-planar skin from the flexible substrate. As another illustrative, non-exclusive example, the flexible substrate may define a plurality of air holes (such as air holes 222) that are in fluid communication with the interface between the charge of composite material and the flexible substrate and the separating at 440 may include providing air, or pressurized air, to the plurality of air holes.

Figure 17:
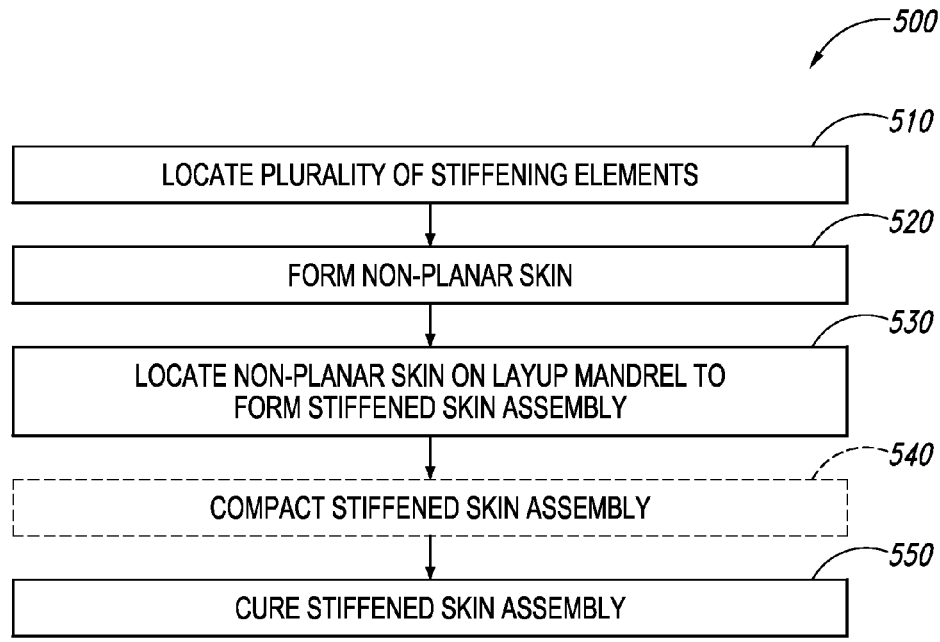
FIG. 17 is a flowchart depicting methods according to the present disclosure of forming a composite structure.

FIG. 17 is a flowchart depicting methods 500 according to the present disclosure of forming a composite structure. Methods 500 include locating a plurality of stiffening elements at 510, forming a non-planar skin at 520, and locating the non-planar skin on a layup mandrel to form a stiffened skin assembly at 530. Methods 500 further may include compacting the stiffened skin assembly at 540 and include curing the stiffened skin assembly at 550.

Locating the plurality of stiffening elements at 510 may include locating the plurality of stiffening elements within a plurality of stiffening element recesses (such as stiffening element recesses 184) of a layup mandrel that defines a non-planar layup mandrel surface contour (such as non-planar mandrel surface contour 182). This may include locating any suitable number of stiffening elements such that the stiffening elements contact, physically contact, and/or mechanically contact the non-planar skin during the locating at 530 and/or during the compacting at 540.

Forming the non-planar skin at 520 may include forming the non-planar skin such that a surface contour of the non-planar skin corresponds to the surface contour of the non-planar layup mandrel. As an illustrative, non-exclusive example, the forming at 520 may include performing methods 400. Locating the non-planar skin on the layup mandrel to form the stiffened skin assembly at 530 may include contacting, physically contacting, and/or mechanically contacting the non-planar skin with the plurality of stiffening elements and/or with the non-planar layup mandrel in any suitable manner.

Compacting the stiffened skin assembly at 540 may include compacting the stiffened skin assembly on the layup mandrel and/or compacting the non-planar skin to the plurality of stiffening elements. This may include increasing contact, or adhesion, between the non-planar skin and the plurality of stiffening element. Curing the stiffened skin assembly at 550 may include curing the stiffened skin assembly in any suitable manner to form the composite structure.

Figure 18:
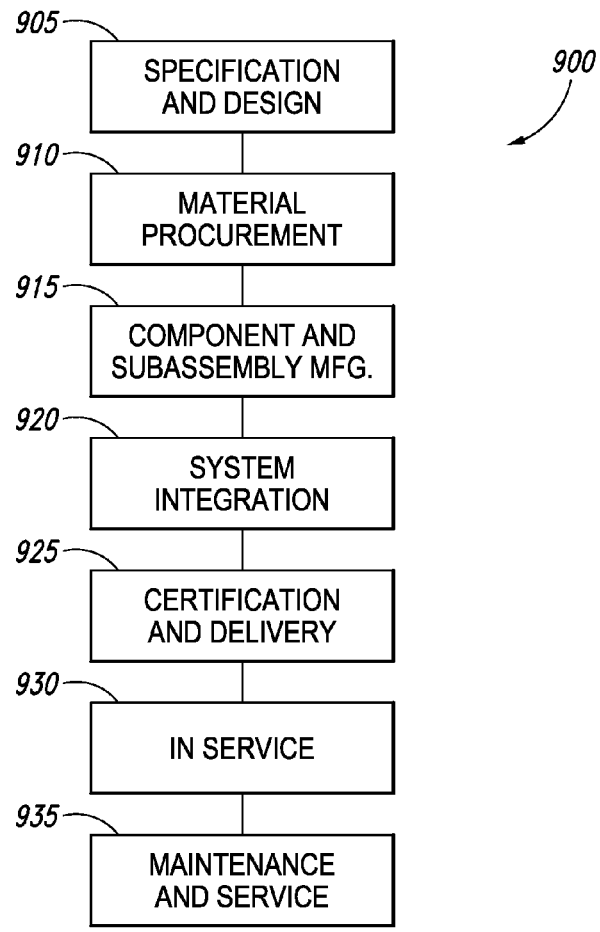
FIG. 18 is a flow diagram of aircraft production and service methodology.
Figure 19:
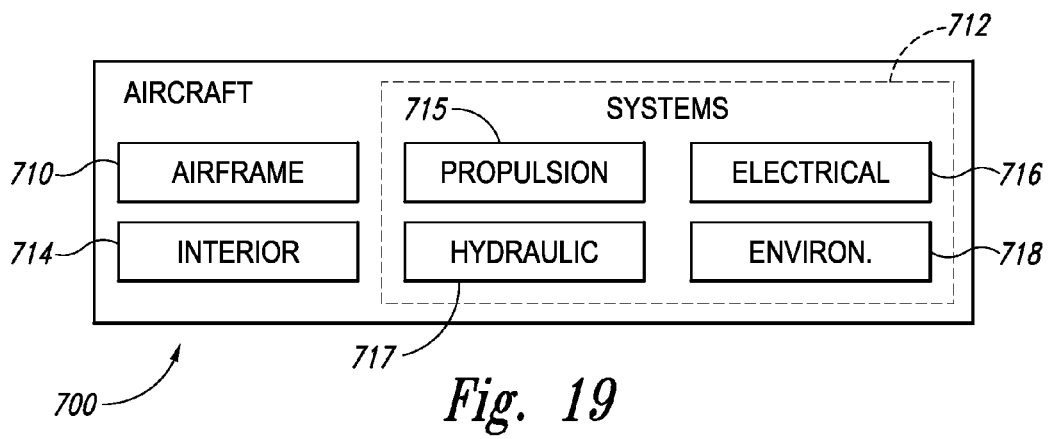
FIG. 19 is a block diagram of an aircraft.

Referring now to FIGS. 18-19, embodiments of the disclosure may be described in the context of an aircraft manufacturing and service method 900, as shown in FIG. 18, and an aircraft 700, as shown in FIG. 19. During pre-production, exemplary method 900 may include specification and design 905 of the aircraft 700 and material procurement 910. During production, component and subassembly manufacturing 915 and system integration 920 of the aircraft 700 takes place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 19, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Apparatus and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more apparatus embodiments, method embodiments, or a combination thereof may be utilized during the production stages 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A method of defining a non-planar skin surface contour of a skin for a composite structure, the method comprising:
  operatively attaching a charge of composite material to a flexible substrate to define a composite-substrate assembly;
  deforming the composite-substrate assembly by conforming the composite-substrate assembly to a non-planar pre-forming surface of a pre-forming mandrel to define the non-planar skin surface contour; and
  during the deforming, maintaining the charge of composite material in tension in a direction that is parallel to an interface between the charge of composite material and the flexible substrate.

A2. The method of paragraph A1, wherein the operatively attaching includes temporarily coupling the charge of composite material to the flexible substrate.

A3. The method of any of paragraphs A1-A2, wherein, during the operatively attaching, the flexible substrate defines an undeformed conformation, and further wherein, subsequent to the deforming, the flexible substrate defines a deformed conformation that is different from the undeformed conformation.

A4. The method of paragraph A3, wherein the undeformed conformation includes a planar, or at least substantially planar, conformation.

A5. The method of any of paragraphs A1-A4, wherein the operatively attaching includes laying up the charge of composite material on the flexible substrate, optionally with a layup tool.

A6. The method of any of paragraphs A1-A5, wherein the operatively attaching includes at least one of (i) placing the charge of composite material on the flexible substrate and (ii) locating the charge of composite material on the flexible substrate.

A7. The method of any of paragraphs A1-A6, wherein the operatively attaching includes operatively attaching the charge of composite material to a flexible contact that is at least one of (i) defined by the flexible substrate and (ii) operatively attached to the flexible substrate.

A8. The method of any of paragraphs A1-A7, wherein the operatively attaching includes applying a vacuum between the charge of composite material and the flexible substrate, optionally with a vacuum manifold that is defined by the flexible substrate.

A9. The method of any of paragraphs A1-A8, wherein the operatively attaching includes vacuum bagging the charge of composite material on the flexible substrate.

A10. The method of any of paragraphs A1-A9, wherein the deforming includes contouring a surface of the charge of composite material from an initial contour to the non-planar skin surface contour, wherein the initial contour is different from the non-planar skin surface contour, and optionally wherein the initial contour is planar, or at least substantially planar.

A11. The method of any of paragraphs A1-A10, wherein the deforming includes applying a deformation force to the composite-substrate assembly.

A12. The method of paragraph A11, wherein the deformation force is at least one of (i) a gravitational force, (ii) a mechanically applied force, (iii) a pressure force, (iv) a pneumatic force, (v) a hydraulic force, and (vi) a vacuum force.

A13. The method of any of paragraphs A1-A12, wherein the deforming further includes regulating at least one of (i) a rate of the deforming, (ii) a length of time during which the deforming occurs, and (iii) a magnitude of a/the deformation force that is applied to the composite-substrate assembly during the deforming.

A14. The method of paragraph A13, wherein the regulating includes regulating to maintain an operative attachment between the charge of composite material and the flexible substrate.

A15. The method of any of paragraphs A13-A14, wherein the regulating includes avoiding separation of the charge of composite material from the flexible substrate during the deforming.

A16. The method of any of paragraphs A1-A15, wherein the non-planar pre-forming surface defines a convex surface contour, and further wherein the deforming includes conforming a surface of the composite-substrate assembly to the convex surface contour.

A17. The method of paragraph A16, wherein the maintaining includes locating the flexible substrate between the pre-forming mandrel and the charge of composite material during the deforming.

A18. The method of any of paragraphs A1-A17, wherein the non-planar pre-forming surface defines a concave surface contour, and further wherein the deforming includes conforming a/the surface of the composite-substrate assembly to the concave surface contour.

A19. The method of paragraph A18, wherein the maintaining includes locating the charge of composite material between the flexible substrate and the pre-forming mandrel during the deforming.

A20. The method of any of paragraphs A1-A19, wherein the maintaining includes preventing wrinkling of the charge of composite material during the deforming.

A21. The method of any of paragraphs A1-A20, wherein the maintaining includes selecting the flexible substrate such that the charge of composite material remains in tension during the deforming, and optionally wherein the selecting the flexible substrate is based, at least in part, on at least one of:
  (i) a thickness of the flexible substrate;
  (ii) a Young's modulus of the flexible substrate;
  (iii) a material composition of the flexible substrate;
  (iv) a thickness of the charge of composite material;
  (v) a Young's modulus of the charge of composite material;
  (vi) a material composition of the charge of composite material;
  (vii) a maximum number plies in a plurality of stacked plies that defines the charge of composite material;
  (viii) an orientation of individual plies within the plurality of stacked plies that defines the charge of composite material;
  (ix) a viscoelasticity of the charge of composite material; and
  (x) a maximum interfacial force that may be applied to the interface between the charge of composite material and the flexible substrate without relative motion therebetween.

A22. The method of any of paragraphs A1-A21, wherein the maintaining includes selecting the charge of the composite material such that the charge of composite material remains in tension during the deforming, and optionally wherein the selecting the charge of composite material is based, at least in part, on at least one of:
  (i) a thickness of the flexible substrate;
  (ii) a Young's modulus of the flexible substrate;
  (iii) a material composition of the flexible substrate;
  (iv) a thickness of the charge of composite material;
  (v) a Young's modulus of the charge of composite material;
  (vi) a material composition of the charge of composite material;
  (vii) a maximum number plies in a plurality of stacked plies that defines the charge of composite material;
  (viii) an orientation of individual plies within the plurality of stacked plies that defines the charge of composite material;
  (ix) a viscoelasticity of the charge of composite material; and
  (x) a maximum interfacial force that may be applied to the interface between the charge of composite material and the flexible substrate without relative motion therebetween.

A23. The method of any of paragraphs A1-A22, wherein the maintaining includes at least one of:

(i) maintaining the charge of composite material completely, or fully, in tension;

(ii) maintaining the charge of composite material in tension across an entire thickness of the charge of composite material; and (iii) maintaining at least a threshold fraction of a total volume of the charge of composite material in tension, optionally wherein the threshold fraction of the total volume includes at least 50%, at least 60%, at least 70%, at least 80%, at least 90%, at least 95%, at least 99%, or 100% of the total volume.

A24. The method of any of paragraphs A1-A23, wherein the method further includes controlling a/the maximum interfacial force that may be applied to the interface between the charge of composite material and the flexible substrate without relative motion therebetween.

A25. The method of paragraph A24, wherein the controlling the maximum interfacial force includes controlling, and optionally actively controlling, during the deforming.

A26. The method of any of paragraphs A24-A25, wherein the method includes applying a/the vacuum between the charge of composite material and the flexible substrate, and further wherein the controlling includes adjusting the vacuum during the deforming, optionally wherein the applying includes applying with a vacuum manifold that is defined by the flexible substrate, and further optionally wherein the applying includes applying with a vacuum bag assembly that encloses the charge of composite material.

A27. The method of any of paragraphs A1-A26, wherein the method further includes heating the charge of composite material at least one of (i) during the deforming, (ii) to accelerate the deforming, and (iii) to produce the deforming.

A28. The method of any of paragraphs A1-A27, wherein the method further includes at least partially curing the charge of composite material subsequent to the deforming, optionally wherein the at least partially curing includes one of (i) B-stage curing the charge of composite material and (ii) completely curing the charge of composite material.

A29. The method of any of paragraphs A1-A28, wherein the method further includes vacuum bagging the charge of composite material prior to the deforming.

A30. The method of any of paragraphs A1-A29, wherein the method further includes vacuum compacting the charge of composite material on the flexible substrate, optionally prior to the deforming, optionally during the deforming, and further optionally subsequent to the deforming.

B1. A method of forming a non-planar skin for a composite structure, the method comprising:

defining a non-planar skin surface contour on a surface of a charge of composite material using the method of any of paragraphs A1-A30 to define a deformed charge of composite material; and separating the deformed charge of composite material from the flexible substrate to define the non-planar skin.

B2. The method of paragraph B1, wherein the deforming includes deforming the flexible substrate to a/the deformed conformation by conforming a surface of the flexible substrate to a non-planar layup surface, and further wherein the separating includes returning the flexible substrate to an/the undeformed conformation that is different from the deformed conformation, and optionally wherein the undeformed conformation includes a/the planar, or at least substantially planar, conformation.

B3. The method of any of paragraphs B1-B2, wherein the method further includes locating a release agent between the charge of composite material and the flexible substrate prior to the operatively attaching, and further wherein the separating includes one of (i) separating the charge of composite material from the release agent and (ii) separating the flexible substrate from the release agent.

B4. The method of any of paragraphs B1-B3, wherein the flexible substrate defines a plurality of air holes that are in fluid communication with the interface between the charge of composite material and the flexible substrate, and further wherein the separating includes providing air to the plurality of air holes, optionally wherein the providing includes providing pressurized air to the plurality of air holes.

B5. The method of any of paragraphs B1-B4, wherein the method further includes separating the composite-substrate assembly from the pre-forming mandrel, optionally prior to separating the deformed charge of composite material from the flexible substrate.

C1. A method of forming a composite structure, the method comprising:

locating a plurality of stiffening elements within a plurality of stiffening element recesses of a layup mandrel that defines a non-planar layup mandrel surface contour;

forming a non-planar skin using the method of any of paragraphs B1-B5, wherein the non-planar skin surface contour of the non-planar skin corresponds to the non-planar layup mandrel surface contour;

locating the non-planar skin on the layup mandrel to form a stiffened skin assembly, wherein the locating includes physically contacting the non-planar skin with the plurality of stiffening elements; and curing the stiffened skin assembly to form the composite structure.

C2. The method of paragraph C1, wherein the plurality of stiffening elements include a plurality of stringers, and further wherein the locating the plurality of stiffening elements includes locating the plurality of stringers.

C3. The method of any of paragraphs C1-C2, wherein the layup mandrel is one of (i) an inner mold line layup mandrel and (ii) an outer mold line layup mandrel.

C4. The method of any of paragraphs C1-C3, wherein the layup mandrel is one of (i) the same as the pre-forming mandrel and (ii) different from the pre-forming mandrel.

C5. The method of any of paragraphs C1-C4, wherein the method further includes compacting the stiffened skin assembly on the layup mandrel and to the plurality of stiffening elements.

D1. An apparatus for defining a non-planar skin surface contour of a skin for a composite structure, the apparatus comprising:

a flexible substrate that is configured to be operatively attached to a charge of composite material to form a composite-substrate assembly; and a pre-forming mandrel that defines a non-planar pre-forming surface, wherein a surface of the composite-substrate assembly is configured to be conformed to the non-planar pre-forming surface to define the non-planar skin surface contour on a surface of the charge of composite material, and further wherein the flexible substrate is configured to maintain the charge of composite material in tension in a direction that is parallel to an interface between the charge of composite material and the flexible substrate while the composite-substrate assembly is conformed to the non-planar pre-forming surface.

D2. The apparatus of paragraph D1, wherein the apparatus further includes the charge of composite material.

D3. The apparatus of any of paragraphs D1-D2, wherein the apparatus further includes the composite-substrate assembly.

D4. The apparatus of paragraph D3, wherein the composite-substrate assembly is a first composite-substrate assembly, wherein the apparatus further includes a second composite-substrate assembly, wherein the first composite-substrate assembly is conformed to the non-planar pre-forming surface of the pre-forming mandrel, and further wherein the second composite-substrate assembly is not conformed to the non-planar pre-forming surface of the pre-forming mandrel.

D5. The apparatus of paragraph D4, wherein the flexible substrate of the first composite-substrate assembly defines a deformed conformation and further wherein the flexible substrate of the second composite-substrate assembly defines an undeformed conformation that is different from the deformed conformation.

D6. The apparatus of paragraph D5, wherein the undeformed conformation defines a planar, or at least substantially planar, conformation.

D7. The apparatus of any of paragraphs D5-D6, wherein the deformed conformation corresponds to a conformation of the non-planar pre-forming surface.

D8. The apparatus of any of paragraphs D1-D7, wherein the non-planar pre-forming surface defines a convex surface contour, wherein the composite-substrate assembly is located on and conformed to the non-planar pre-forming surface, and further wherein the flexible substrate is located between the pre-forming mandrel and the charge of composite material.

D9. The apparatus of any of paragraphs D1-D7, wherein the non-planar pre-forming surface defines a concave surface contour, wherein the composite-substrate assembly is located on and conformed to the non-planar pre-forming surface, and further wherein the charge of composite material is located between the flexible substrate and the pre-forming mandrel.

D10. The apparatus of any of paragraphs D1-D9, wherein the apparatus further includes an interfacial force control assembly that is configured to regulate a maximum interfacial force that may be applied to the interface between the charge of composite material and the flexible substrate without relative motion therebetween.

D11. The apparatus of paragraph D10, wherein the interfacial force control assembly includes a vacuum assembly that is configured to apply a vacuum between the charge of composite material and the flexible substrate, optionally wherein the vacuum assembly includes a vacuum manifold that is defined by the flexible substrate, and further optionally wherein the vacuum assembly includes a vacuum bag assembly that encloses the charge of composite material.

D12. The apparatus of any of paragraphs D1-D11, wherein the composite-substrate assembly is located on the non-planar pre-forming surface, and further wherein the apparatus includes a heating assembly that is configured to heat the charge of composite material to at least one of (i) increase a rate at which the charge of composite material conforms to the non-planar pre-forming surface and (ii) at least partially cure the charge of composite material.

D13. The apparatus of any of paragraphs D1-D12, wherein the apparatus further includes a/the vacuum bag assembly that encloses the charge of composite material, optionally wherein the vacuum bagging assembly is configured to compact the charge of composite material on the flexible substrate.

D14. The apparatus of any of paragraphs D1-D13, wherein the flexible substrate is configured to at least one of:
  (i) maintain the charge of composite material completely, or fully, in tension;
  (ii) maintain the charge of composite material in tension across an entire thickness of the charge of composite material; and
  (iii) maintain at least a threshold fraction of a total volume of the charge of composite material in tension, optionally wherein the threshold fraction of the total volume includes at least 50%, at least 60%, at least 70%, at least 80%, at least 90%, at least 95%, at least 99%, or 100% of the total volume.

E1. An apparatus for forming a composite structure, the apparatus comprising:
  a layup mandrel that defines a plurality of stiffening element recesses, which are configured to receive a plurality of stiffening elements, and a mandrel surface, which defines a non-planar mandrel surface contour and is configured to receive a non-planar skin; and
  the apparatus for defining a non-planar skin surface contour of any of paragraphs D1-D14.

E2. The apparatus of paragraph E1, wherein the apparatus includes the plurality of stiffening elements, and optionally wherein the plurality of stiffening elements is located within the plurality of stiffening element recesses.

E3. The apparatus of any of paragraphs E1-E2, wherein the plurality of stiffening elements includes a plurality of stringers.

E4. The apparatus of any of paragraphs E1-E3, wherein the apparatus further includes the non-planar skin, and optionally wherein the non-planar skin is received on the mandrel surface.

F1. The method of any of paragraphs A1-O5 or the apparatus of any of paragraphs D1-E4, wherein the charge of composite material includes a plurality of stacked plies of composite material.

F2. The method of paragraph F1 or the apparatus of paragraph F1, wherein the plurality of stacked plies includes at least one of:
  (i) at least 2, at least 4, at least 6, at least 10, at least 15, at least 20, at least 30, at least 40, at least 50, or at least 60 stacked plies; and
  (ii) fewer than 100, fewer than 90, fewer than 80, fewer than 70, fewer than 60, fewer than 50, or fewer than 40 stacked plies.

F3. The method of any of paragraphs A1-O5 or F1-F2 or the apparatus of any of paragraphs D1-F2, wherein the plurality of stacked plies defines an entire thickness of the skin for the composite structure.

F4. The method of any of paragraphs A1-O5 or F1-F3 or the apparatus of any of paragraphs D1-F3, wherein the charge of composite material includes a planar, or at least substantially planar, charge of composite material.

F5. The method of any of paragraphs A1-O5 or F1-F4 or the apparatus of any of paragraphs D1-F4, wherein the charge of composite material defines two opposed sides that are separated by a/the thickness of the charge of composite material, wherein one of the two opposed sides defines a portion of the interface between the charge of composite material and the flexible substrate, and further wherein the two opposed sides define at least a threshold fraction of a surface area of the charge of composite material, and optionally wherein the threshold fraction of the surface area is at least 50%, at least 60%, at least 70%, at least 75%, at least 80%, at least 85%, at least 90%, at least 95%, or at least 99% of the surface area.

F6. The method of any of paragraphs A1-O5 or F1-F5 or the apparatus of any of paragraphs D1-D5, wherein the charge of composite material includes a plurality of fibers and a resin material, optionally wherein the plurality of fibers includes at least one of a plurality of carbon fibers, a plurality of polymeric fibers, and a plurality of glass fibers, and further optionally wherein the resin material includes at least one of an epoxy, an adhesive, and a polymeric resin.

F7. The method of any of paragraphs A1-05 or F1-F6 or the apparatus of any of paragraphs D1-D6, wherein the charge of composite material includes a pre-impregnated composite material, and optionally a pre-impregnated composite tape.

F8. The method of any of paragraphs A1-05 or F1-F7 or the apparatus of any of paragraphs D1-F7, wherein the flexible substrate is formed from at least one of a polymeric material, a plastic, polycarbonate, a polyester, a metal, and aluminum.

F9. The method of any of paragraphs A1-05 or F1-F8 or the apparatus of any of paragraphs D1-F8, wherein the flexible substrate is solid and substantially free of voids.

F10. The method of any of paragraphs A1-05 or F1-F9 or the apparatus of any of paragraphs D1-F9, wherein the flexible substrate defines one or more voids therein.

F11. The method of any of paragraphs A1-05 or F1-F10 or the apparatus of any of paragraphs D1-F10, wherein the flexible substrate is defined by a first planar wall, a second planar wall, and a plurality of elongate webs that extend between the first planar wall and the second planar wall, optionally wherein the first planar wall, the second planar wall, and the plurality of elongate webs define a plurality of elongate channels, optionally wherein the flexible substrate is a panel, and further optionally wherein the planar substrate is a double-walled panel.

F12. The method of any of paragraphs A1-05 or F1-F11 or the apparatus of any of paragraphs D1-F11, wherein a contour of the non-planar pre-forming surface corresponds to a contour of at least one of an airframe, a fuselage of an aircraft, a fuselage barrel of an aircraft, a wing of an aircraft, and a stabilizer of an aircraft.

F13. The method of any of paragraphs A1-05 or F1-F12 or the apparatus of any of paragraphs D1-F12, wherein the non-planar skin surface contour corresponds to a contour of at least one of an airframe, a fuselage of an aircraft, a fuselage barrel of an aircraft, a wing of an aircraft, and a stabilizer of an aircraft.

F14. The method of any of paragraphs A1-05 or F1-F13 or the apparatus of any of paragraphs D1-F13, wherein non-planar layup mandrel surface contour corresponds to a contour of at least one of an airframe, a fuselage of an aircraft, a fuselage barrel of an aircraft, a wing of an aircraft, and a stabilizer of an aircraft.

F15. The method of any of paragraphs A1-05 or F1-F14 or the apparatus of any of paragraphs D1-F14, wherein the composite structure includes, and optionally is, at least one of an airframe, a fuselage of an aircraft, a fuselage barrel of an aircraft, a wing of an aircraft, and a stabilizer of an aircraft.

F16. The method of any of paragraphs A1-05 or F1-F15 performed using the apparatus of any of paragraphs D1-F15.

F17. The apparatus of any of paragraphs D1-F15 operated under the method of any of paragraphs A1-05 or F1-F15.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of defining a non-planar skin surface contour of a skin for a composite structure, the method comprising:
   operatively attaching a charge of composite material to a flexible substrate to define a composite-substrate assembly, wherein the charge of composite material includes a plurality of stacked plies of composite material;
   deforming the composite-substrate assembly by conforming the composite-substrate assembly to a non-planar pre-forming surface of a pre-forming mandrel to define the non-planar skin surface contour;
   during the deforming, maintaining the charge of composite material in tension in a direction that is parallel to an interface between the charge of composite material and the flexible substrate;
   applying a vacuum between the charge of composite material and the flexible substrate; and
   controlling a maximum interfacial force that may be applied to the interface between the charge of composite material and the flexible substrate without relative motion therebetween by adjusting the vacuum during the deforming.

2. A method of defining a non-planar skin surface contour of a skin for a composite structure, the method comprising:
   operatively attaching a charge of composite material to a flexible substrate to define a composite-substrate assembly, wherein the charge of composite material includes a plurality of stacked plies of composite material, wherein the flexible substrate is a double-walled panel that is defined by a first planar wall, a second planar wall, and a plurality of elongate webs that extends between the first planar wall and the second planar wall, and further wherein the first planar wall, the second planar wall, and the plurality of elongate webs together define a plurality of elongate channels;
   deforming the composite-substrate assembly by conforming the composite-substrate assembly to a non-planar pre-forming surface of a pre-forming mandrel to define the non-planar skin surface contour; and
   during the deforming, maintaining the charge of composite material in tension in a direction that is parallel to an interface between the charge of composite material and the flexible substrate.

3. The method of claim 2, wherein, during the operatively attaching, the flexible substrate defines an undeformed conformation, and further wherein, subsequent to the deforming, the flexible substrate defines a deformed conformation that is different from the undeformed conformation.

4. The method of claim 3, wherein the undeformed conformation includes a planar conformation.

5. The method of claim 2, wherein the deforming includes contouring a surface of the charge of composite material from an initial contour to the non-planar skin surface contour, wherein the initial contour is different from the non-planar skin surface contour.

6. The method of claim 2, wherein the deforming includes applying a deformation force to the composite-substrate assembly, wherein the deformation force is at least one of (i) a gravitational force, (ii) a mechanically applied force, (iii) a pressure force, (iv) a pneumatic force, (v) a hydraulic force, and (vi) a vacuum force.

7. The method of claim 2, wherein the deforming further includes regulating at least one of (i) a rate of the deforming, (ii) a length of time during which the deforming occurs, and (iii) a magnitude of a deformation force that is applied to the composite-substrate assembly during the deforming.

8. The method of claim 7, wherein the regulating includes avoiding separation of the charge of composite material from the flexible substrate during the deforming.

9. The method of claim 2, wherein the non-planar pre-forming surface defines a convex surface contour, wherein the deforming includes conforming a surface of the composite-substrate assembly to the convex surface contour, and further wherein the maintaining includes locating the flexible substrate between the pre-forming mandrel and the charge of composite material during the deforming.

10. The method of claim 2, wherein the non-planar pre-forming surface defines a concave surface contour, wherein the deforming includes conforming a surface of the composite-substrate assembly to the concave surface contour, and further wherein the maintaining includes locating the charge of composite material between the flexible substrate and the pre-forming mandrel during the deforming.

11. The method of claim 2, wherein the method further includes controlling a maximum interfacial force that may be applied to the interface between the charge of composite material and the flexible substrate without relative motion therebetween.

12. The method of claim 11, wherein the method includes applying a vacuum between the charge of composite material and the flexible substrate, and further wherein the controlling includes adjusting the vacuum during the deforming.

13. The method of claim 2, wherein the method further includes heating the charge of composite material at least one of (i) during the deforming, (ii) to accelerate the deforming, and (iii) to produce the deforming.

14. The method of claim 2, wherein the method further includes vacuum compacting the charge of composite material on the flexible substrate.

15. The method of claim 2, wherein the method further includes controlling a maximum interfacial force that may be applied to the interface between the charge of composite material and the flexible substrate without relative motion therebetween by applying a vacuum between the charge of composite material and the flexible substrate and adjusting the vacuum during the deforming, wherein the applying the vacuum includes applying the vacuum with a vacuum manifold that is at least partially defined by the plurality of elongate channels of the double-walled panel.

16. The method of claim 2, wherein the method includes placing a first portion of the composite-substrate assembly in tension, via the deforming, in the direction that is parallel to the interface between the charge of composite material and the flexible substrate and also placing a second portion of the composite-substrate assembly in compression, via the deforming, in the direction that is parallel to the interface between the charge of composite material and the flexible substrate, wherein the first portion of the composite-substrate assembly and the second portion of the composite-substrate assembly meet at a tension-compression crossover point of the composite-substrate assembly, and further wherein the maintaining the charge of composite material in tension includes maintaining the tension-compression crossover point of the composite-substrate assembly within the flexible substrate.

17. A method of forming a composite structure, the method comprising:
  locating a plurality of stiffening elements within a plurality of stiffening element recesses of a layup mandrel that defines a non-planar layup mandrel surface contour;
  forming a non-planar skin by defining a non-planar skin surface contour on a surface of a charge of composite material to define a deformed charge of composite material, wherein the non-planar skin surface contour of the non-planar skin corresponds to the non-planar layup mandrel surface contour, and further wherein the forming includes:
  (i) operatively attaching the charge of composite material to a flexible substrate to define a composite-substrate assembly, wherein the charge of composite material includes a plurality of stacked plies of composite material;
  (ii) deforming the composite-substrate assembly by conforming the composite-substrate assembly to a non-planar pre-forming surface of a pre-forming mandrel to define the non-planar skin surface contour;
  (iii) during the deforming, maintaining the charge of composite material in tension in a direction that is parallel to an interface between the charge of composite material and the flexible substrate; and
  (iv) separating the deformed charge of composite material from the flexible substrate to define the non-planar skin;
  locating the non-planar skin on the layup mandrel to form a stiffened skin assembly, wherein the locating includes physically contacting the non-planar skin with the plurality of stiffening elements; and
  curing the stiffened skin assembly to form the composite structure.

18. The method of claim 17, wherein the deforming includes deforming the flexible substrate to a deformed conformation by conforming a surface of the flexible substrate to a non-planar layup surface, and further wherein the separating includes returning the flexible substrate to an undeformed conformation that is different from the deformed conformation.

19. The method of claim 17, wherein the method further includes separating the composite-substrate assembly from the pre-forming mandrel.

20. The method of claim 17, wherein the flexible substrate is a double-walled panel that is defined by a first planar wall, a second planar wall, and a plurality of elongate webs that extends between the first planar wall and the second planar wall, and further wherein the first planar wall, the second planar wall, and the plurality of elongate webs together define a plurality of elongate channels.

21. A method of defining a non-planar skin surface contour of a skin for a composite structure, the method comprising:
- operatively attaching a charge of composite material to a flexible substrate to define a composite-substrate assembly, wherein the charge of composite material includes a plurality of stacked plies of composite material;
- deforming the composite-substrate assembly by conforming the composite-substrate assembly to a non-planar pre-forming surface of a pre-forming mandrel to define the non-planar skin surface contour, wherein the non-planar pre-forming surface defines a concave surface contour, and further wherein the deforming includes conforming a surface of the composite-substrate assembly to the concave surface contour; and
- during the deforming, maintaining the charge of composite material in tension in a direction that is parallel to an interface between the charge of composite material and the flexible substrate, wherein the maintaining includes locating the charge of composite material between the flexible substrate and the pre-forming mandrel during the deforming.

* * * * *